(12) United States Patent
Kobayashi

(10) Patent No.: US 7,415,179 B2
(45) Date of Patent: Aug. 19, 2008

(54) OPTICAL FIBER CONNECTOR BODY WITH MUTUALLY COAXIAL AND INCLINED CORES, OPTICAL CONNECTOR FOR FORMING THE SAME, AND MODE CONDITIONER AND OPTICAL TRANSMITTER USING THE SAME

(75) Inventor: Yoshihiro Kobayashi, Hokkaido (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/621,078

(22) Filed: Jan. 8, 2007

(65) Prior Publication Data
US 2007/0122091 A1  May 31, 2007

Related U.S. Application Data

(62) Division of application No. 11/194,071, filed on Jul. 28, 2005, now abandoned.

(51) Int. Cl.
G02B 6/26 (2006.01)
(52) U.S. Cl. .......................................... 385/50
(58) Field of Classification Search ................... 385/50, 385/147; 324/635
See application file for complete search history.

(56) References Cited

U.S. PATENT DOCUMENTS

| | | | |
|---|---|---|---|
| 4,641,917 A | 2/1987 | Glodis et al. ................ 385/127 |
| 5,077,815 A | 12/1991 | Yoshizawa et al. ............ 385/28 |
| 6,280,850 B1 * | 8/2001 | Oh et al. ...................... 428/428 |
| 6,483,975 B1 * | 11/2002 | Hsu et al. .................... 382/123 |
| 6,498,888 B1 | 12/2002 | Chenard et al. ............. 385/127 |
| 6,501,875 B2 * | 12/2002 | Zhao et al. .................... 385/30 |
| 6,616,343 B2 * | 9/2003 | Katsura et al. ................ 385/55 |
| 6,643,428 B2 * | 11/2003 | Chang .......................... 385/33 |
| 6,665,481 B2 * | 12/2003 | Hebgen et al. .............. 385/123 |
| 6,751,390 B2 * | 6/2004 | Qi et al. ....................... 385/127 |
| 2003/0048992 A1 * | 3/2003 | Lundqvist .................... 385/50 |
| 2003/0108317 A1 | 6/2003 | Qi et al. ...................... 385/127 |
| 2003/0142940 A1 | 7/2003 | Qi et al. ...................... 385/127 |

FOREIGN PATENT DOCUMENTS

| | | | |
|---|---|---|---|
| JP | 405088046 A | * | 4/1993 |
| JP | 2000-147334 | | 5/2000 |
| JP | 2000-231027 | | 8/2000 |
| JP | 2001-013375 | | 1/2001 |

* cited by examiner

*Primary Examiner*—Ellen Kim
(74) *Attorney, Agent, or Firm*—Hogan & Hartson LLP

(57) ABSTRACT

An optical fiber connected body including a first optical fiber having a core and a clad, and a second optical fiber having a core and a clad, with its end connected optically to an end of the first optical fiber, in which the core center of the first optical fiber and the core center of the second optical fiber are mutually deviated at the interface of the first optical fiber and the second optical fiber, a light beam entering the second optical fiber from the first optical fiber is inclined to the central axis of the second optical fiber.

12 Claims, 16 Drawing Sheets

APPENDIX A
Fig.5B (Present invention)
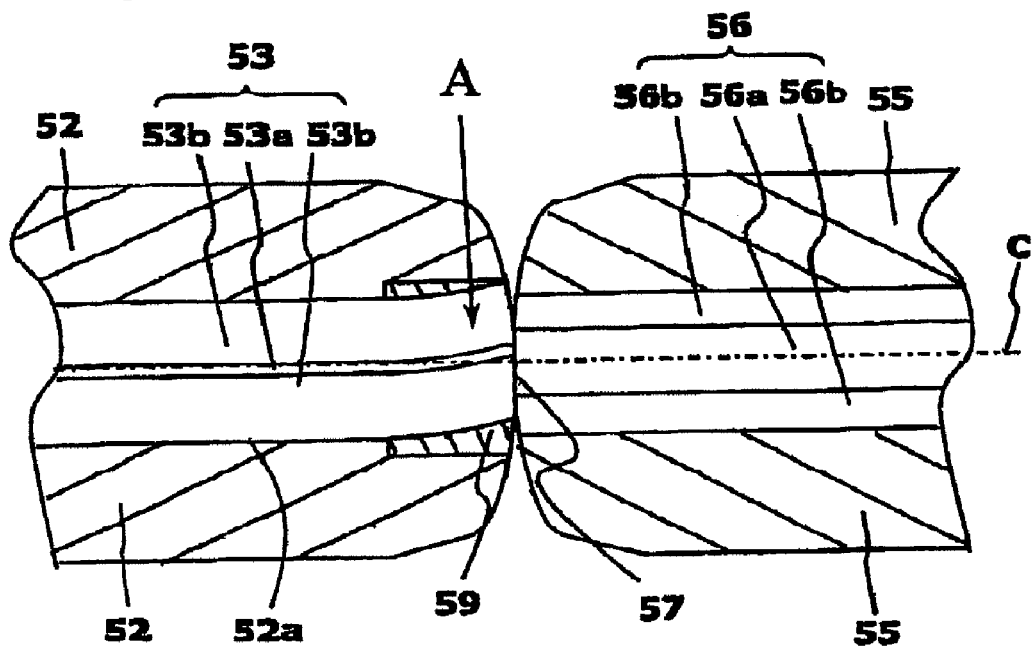
Fig. 5 ISAWA
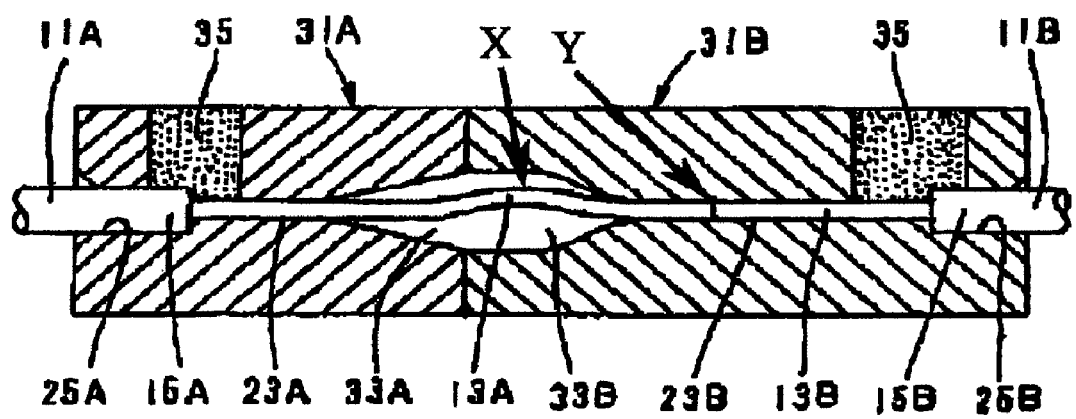

OPTICAL FIBER CONNECTOR BODY WITH MUTUALLY COAXIAL AND INCLINED CORES, OPTICAL CONNECTOR FOR FORMING THE SAME, AND MODE CONDITIONER AND OPTICAL TRANSMITTER USING THE SAME

RELATED APPLICATIONS

This is a divisional of application Ser. No. 11/194,071 filed on Jul. 28, 2005 now abandoned, which claims priority under 35 USC 119 in Japanese Patent Application No. 2004-220065, filed Jul. 28, 2004, application No. 2004-340344 filed Nov. 25, 2004, application No. 2004-375130 filed Dec. 27, 2004, and application No. 2005-020888 filed Jan. 28, 2005, which applications are incorporated by reference in their entirety.

BACKGROUND OF THE INVENTION

1. Field of the Invention

The present invention relates to an optical fiber connected body in which optical fibers are connected with each other, which is used in optical communications, an optical connector for forming the same, and a mode conditioner and an optical transmitter optical connector using the same.

2. Description of the Related Art

Systems used for connecting computers include 10-megabit Ethernet (registered trademark) and 100-megabit Fast Ethernet (registered trademark), and they are further to be replaced by gigabit Ethernet (registered trademark) of larger transmission capacity. For superfast large capacity transmission, development has been started for 10-gigabit Ethernet (registered trademark).

For high speed and large capacity of data transmission, transmission system must be changed from electrical signal to optical signal. Optical signal is further demanded to be changed from optical signal emitted by light emitting diode (LED) to optical signal emitted by laser diode (LD). Communication cables are also changed from copper wires to multimode optical fiber and further to single mode optical fiber for the benefits of high speed and large capacity of transmission.

On the other hand, cable networks of the multimode optical fibers are already established, and it is attempted to realize high speed and large capacity transmission by using them. When LD light is put in the multimode optical fiber, since the spot size of LD light is smaller than the core diameter of the multimode optical fiber, the core is not sufficiently filled with light, and excitation is not successful. It is hence devised to put the LD light directly into the single mode optical fiber, and bond it to an existing multimode optical fiber.

In an existing multimode optical fiber, however, a dimple-like portion that is low in refractive index may be formed in the central area as shown in FIG. 19B in its manufacturing process. Accordingly, when the single mode optical fiber receiving the LD light is connected to the multimode optical fiber, some of the modes may be dispersed, and various signals may interfere with each other. As a result, an accurate signal cannot be received in the receiver, and the transmission distance is extremely shortened.

It is hence proposed to connect the single mode optical fiber and the multimode optical fiber by deviating the central axis. For example, Japanese Laid-open Patent Application No. 2001-13375 discloses an optical connector for connecting the single mode optical fiber and the multimode optical fiber by deviating the central axis of cores.

Japanese Laid-open Patent Application No. 2000-231027 discloses a mode conditioner using a patching cord connecting the single mode optical fiber and the multimode optical fiber by deviating the central axis of cores, at the transmission side.

Japanese Laid-open Patent Application No. 2000-147334 discloses an optical transmitter with mode conditioner having a single mode optical fiber eccentric in the central axis of core provided in a fiber stab. To this optical transmitter, a plug ferrule having the multimode optical fiber is connected for making optical transmission.

By using these optical fibers, mode conditioner, and optical transmitter with mode conditioner, the light passing through the single mode optical fiber enters the multimode optical fiber by evading a dimple-like portion low in refractive index formed in the central area as shown in FIG. 19B. Hence, suppressing abnormal dispersion of modes, data can be transmitted efficiently.

SUMMARY OF THE INVENTION

In the conventional configuration, however, when the transmission speed becomes faster and the transmission distance becomes longer, abnormal dispersion of modes cannot be suppressed sufficiently. For example, in the case of Ethernet having transmission speed of up to 1 gigabit, abnormal dispersion of modes hardly occurs in the conventional configuration. But in the 10-megabit Ethernet, at transmission distance of 550 m, some of the modes of incident light are dispersed. As a result, various signals interfere with each other, and accurate signal cannot be received in the receiver.

It is hence an object of the present invention to provide an optical fiber connected body capable of suppressing abnormal dispersion of modes and transferring signals efficiently, event at faster transmission speed and longer transmission distance.

According to the present invention, an optical fiber connected body comprises:

a first optical fiber having a core and a clad, and a second optical fiber having a core and a clad, with its end connected optically to an end of the first optical fiber, wherein the core center of the first optical fiber and the core center of the second optical fiber are mutually deviated at the interface of the first optical fiber and the second optical fiber, and a light beam entering the second optical fiber from the first optical fiber is inclined to the central axis of the second optical fiber.

Preferably, the first optical fiber is a single mode optical fiber and the second optical fiber is a multimode optical fiber. Since the core center of the first optical fiber and the core center of the second optical fiber are eccentric, and the light enters obliquely in the axial direction of the second optical fiber, abnormal dispersion of modes is less likely to occur than in the prior art, and signals do not interfere with each other, and signals can be transmitted efficiently.

The distance between the core center of the first optical fiber and the core center of the second optical fiber is preferred to be 5 to 30 μm, or more preferably 5 to 25 μm. The light beam entering the second optical fiber from the first optical fiber is preferred to be inclined by 3 to 25 degrees to the central axis of the second optical fiber.

Supposing the direction linking the core center of the first optical fiber and the core center of the second optical fiber to be X-axis, the central axis direction of the second optical fiber to be Z-axis, and the direction at right angle to X-axis and Z-axis to be Y-axis, and further supposing the axis by deviating the Y-axis by the portion of the distance between the core center of the first optical fiber and the core center of the second optical fiber in the X-direction to be Y'-axis, and the axis by deviating the Z-axis by the portion of the distance between the core center of the first optical fiber and the core center of the second optical fiber in the X-direction to be Z'-axis, the light beam entering the second optical fiber from the first optical fiber is preferred to be present inside of a plane formed by the Y'-axis and Z'-axis.

The optical fiber connected body of the invention can be applied in optical connector, mode conditioner, optical transmitter, etc.

An optical fiber connector of the present invention comprises:

a first fixing member for fixing a first optical fiber, and a second fixing member for fixing a second optical fiber, wherein the core center of the first optical fiber and the core center of the second optical fiber are mutually deviated at the interface of the first optical fiber and the second optical fiber, and the first fixing member and the second fixing member are connected so that the light beam entering the second optical fiber from the first optical fiber is inclined to the central axis of the second optical fiber.

A mode conditioner of the present invention comprises a connector between a single mode optical fiber and a multimode optical fiber, wherein the core center of the single mode optical fiber and the core center of the multimode optical fiber are mutually deviated at the interface of the single mode optical fiber and the multimode optical fiber, and the light beam entering the multimode optical fiber from the single mode optical fiber is inclined to the central axis of the multimode optical fiber.

An optical transmitter of the present invention comprises:

a laser diode, a fiber stab for holding a first optical fiber in a through-hole, and a sleeve for inserting a plug ferrule, which holds a second optical fiber in a through-hole, from outside, the sleeve being fitted into the fiber stab, wherein, when the plug ferrule is inserted, the first optical fiber in the fiber stab and the second optical fiber in the plug ferrule are optically connected, the core center of the first optical fiber and the core center of the second optical fiber are mutually deviated at the interface of the first optical fiber and the second optical fiber, and the light beam entering the second optical fiber from the first optical fiber is inclined to the central axis of the optical fiber.

BRIEF DESCRIPTION OF THE DRAWINGS

FIG. 5A is a sectional view of an optical transmitter in embodiment 3.

FIG. 5B is a partially magnified sectional view of connecting portion of optical fibers of the optical transmitter in FIG. 5A.

DESCRIPTION OF THE PREFERRED EMBODIMENTS

Embodiment 1

In this embodiment, the invention is applied in an optical connector. The optical connector of the embodiment is an optical connector for connecting both ends of a pair of optical fibers, in which the optical fibers are connected so that the core centers of the optical fibers are mutually deviated, and that an incident beam from one optical fiber enters at an inclination to the axial center of other optical fiber.

According to the optical connector of the embodiment, when a single mode optical fiber is connected to a multimode optical fiber, abnormal dispersion occurring in the multimode optical fiber can be suppressed. Therefore, even at fast transmission speed and long transmission distance, abnormal dispersion of modes is suppressed, and signals can be transferred at high efficiency. Dispersion occurring in the multimode optical fiber is specifically described below.

Figure 19A:
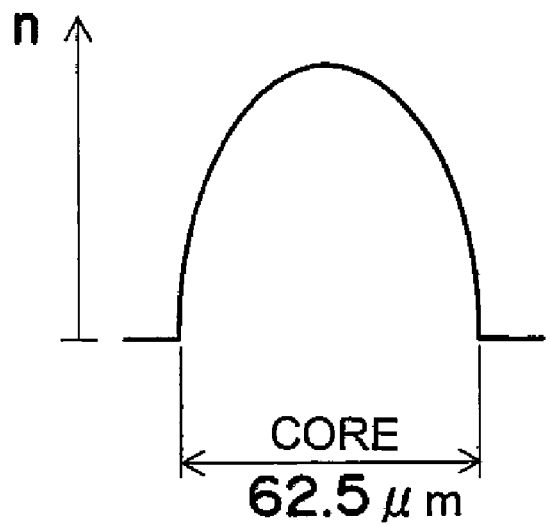
FIG. 19A is a schematic diagram of refractive index distribution in an ideal multimode fiber.
Figure 19B:
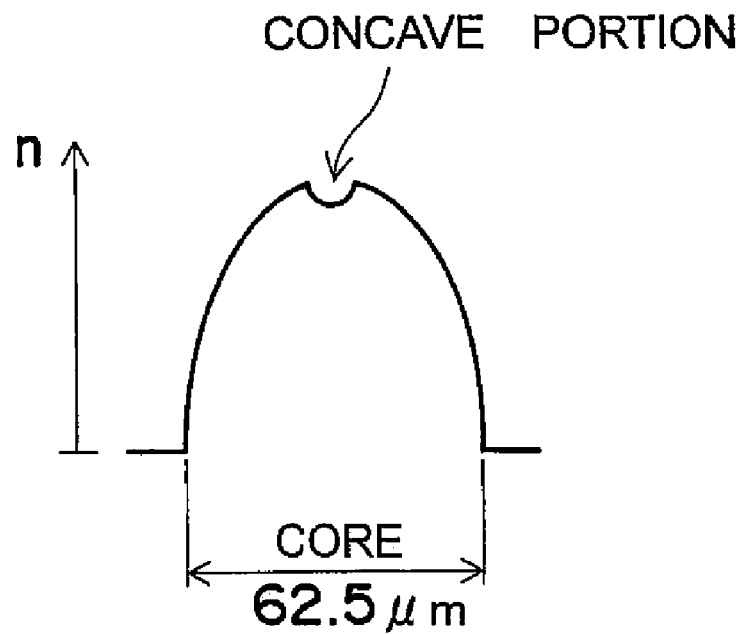
FIG. 19B is a schematic diagram of refractive index distribution in an actual multimode fiber.

The multimode optical fiber of graded index type (called multimode optical fiber hereinafter) is designed and manufactured so that refractive index distribution of core may decline from the center to outside in an accurate quadratic curve as shown in FIG. 19A in order to suppress band deterioration (mode dispersion) due to delay difference between modes. In the multimode optical fiber, however, a dimple-like portion low in refractive index may be formed in the central area as shown in FIG. 19B. Accordingly, some of the modes of the incident light may be dispersed, and various signals may interfere with each other. FIGS. 19A and 19B are refractive index distribution diagrams of the multimode optical fiber having abnormal low refractive index in the core center, in which the axis of abscissas represents the distance from the core central axis, and the axis of ordinates represents the refractive index.

Such refractive index distribution may lead to deterioration of transmission performance. Generally, the multimode optical fiber is used in optical transmission at hundreds of Mb/s orless, and the LED is mainly used in the light source for optical transmission, and the problem has not been serious so far. Recently, however, the existing multimode optical fiber is demanded to be used in very fast optical transmission of Gb/s class. It is hence an urgent problem how to suppress transmission deterioration while using the optical fiber having refractive index distribution as shown in FIG. 19B.

In the multimode optical fiber having refractive index distribution as shown in FIG. 19B, since the refractive index is small in the core center, and the light propagating through the core center is faster than the light propagating through the core peripheral part. Therefore, light pulses are transmitted, the pulses are dispersed due to delay difference between the light passing through the core center and the light passing through the core peripheral part. Such delay causing dispersion is called differential mode delay (DMD). Such phenomenon is likely to occur when light of high degree of parallelism is concentrated in the central area of optical fiber core.

In the optical transmitter, if the transmission speed is the same, the specification may be different depending on the type of conforming optical fiber or wavelength of light source. In the case of optical transmission of Gb/s class by the multimode optical fiber, LD is more beneficial than LED from the viewpoint of response speed of element. Also from the viewpoint of dispersion, the LD of longer wavelength (1300 nm band) is superior to the LD of shorter wavelength (for examples about 850 nm band), and the transmission distance can be extended further.

In particular, when long wavelength LD is used, output light easily enters the core center of the multimode optical fiber in a state of high degree of parallelism, and hence it is important to suppress the DMD of the multimode optical fiber.

Figure 1A:
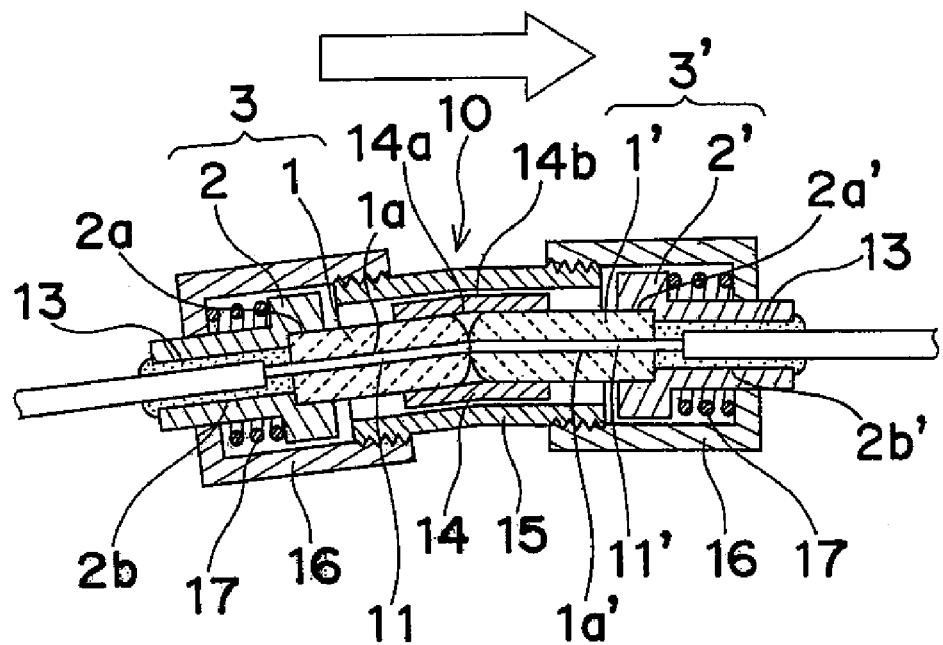
FIG. 1A is a sectional view of an optical connector in embodiment 1.

FIG. 1A is a sectional view of optical connector 10 of the embodiment.

An example of FC type optical connector is explained. A pair of optical fiber fixing tools 3, 3' are fitted against each other. The optical fiber fixing tools 3, 3' comprise (a) ferrules 1, 1' having axial holes 1a, 1a' for inserting and fixing optical fibers 11, 11', and (b) ferrule supports 2, 2' having recesses 2a, 2a' to be engaged with ferrules 1, 1', and through-holes 2b, 2b' communicating with the recesses 2a, 2a' and coaxial with the axial holes 1a, 1a', of the ferrules 1, 1'. Optical fibers 11, 11' are inserted into axial holes 1a, 1a' of the ferrules 1, 1', and through-holes 2b, 2b' of the ferrule supports 2, 2' are filled with an adhesive 3, so that the optical fibers 11, 11' are fixed.

The pair of ferrules 1, 1' are held by a bent sleeve 14. An adapter coupling 15 having threads at both ends is disposed on the outer circumference of the sleeve 14. Coupling nuts 16 are fitted to the threads at both ends of the adapter coupling 15. The ferrule support 2 is disposed in each coupling nut 16, and a spring 17 is disposed between the inner wall of the coupling nut 16 and the flange-like protrusion of the ferrule support 2. By the pressing force of the spring 17 disposed between the coupling nut 16 and ferrule support 2, the leading ends of the ferrules 1, 1' of the optical fiber fixing tools 3, 3' are fitted to each other. As a result, the optical fibers 11, 11' are optically connected to each other.

Figure 1B:
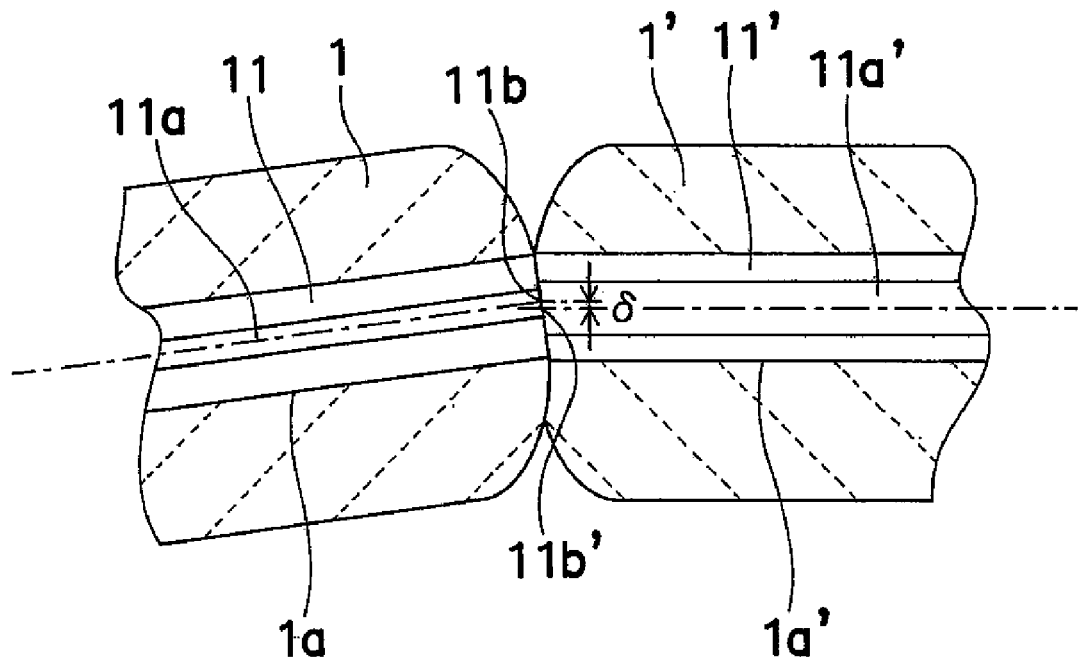
FIG. 1B is a partially magnified sectional view of connecting portion of optical fibers of the optical connector in FIG. 1A.

FIG. 1B is a magnified view of abutting portion of optical fiber 11 and optical fiber 11'. Herein, the optical fiber 11 is supposed to be a single mode optical fiber, and the optical fiber 11' is a multimode optical fiber. The incident side ferrule 1 has its axial hole 1a nearly in the center of the outer circumference, and the single mode optical fiber 11 is adhered and fixed to the axial hole 1a. The exit side ferrule 1' has its axial hole 1a' at a position eccentric from the center of the outer circumference, and the multimode optical fiber 11' is adhered and fixed to the axial hole 1a'. The core center 1ib of the single mode optical fiber 11 and the core center 11b' of the multimode optical fiber 11' are deviated from each other by δ. Instead of the axial hole 1a' of the ferrule 1', the axial hole 1a of the ferrule 1 may be set eccentric. Further, both the axial hole 1a of the ferrule 1 and axial hole 1a' of the ferrule 1' may be set eccentric by different extents.

As shown in FIG. 1A, the sleeve 14 is cylindrical, and an inner hole 14a of the sleeve 14 is bent at the center 14b. Accordingly, as shown in FIG. 1B, the ferrule 1 and ferrule 1' abut against each other obliquely by way of the sleeve (not shown). Therefore, the core central axis of optical fiber 11 is inclined to the core central axis of optical fiber 11'. That is, the light beam entering the optical fiber 11' from the optical fiber 11 advances at an inclination to the optical axis of the optical fiber 11'.

Thus, in the embodiment, the core center of the single mode optical fiber 11 and the core center of the multimode optical fiber 11' are mutually deviated, and the light beam emitted from the single mode optical fiber 11 enters the multimode optical fiber obliquely to its optical axis. Therefore, the light beam emitted from the single mode optical fiber 11 enters the multimode optical fiber 11' obliquely by evading the dimple-like portion low in refractive index in the central area. As a result, occurrence of DMD in the multimode optical fiber 11' can be suppressed effectively. That is, abnormal dispersion of modes hardly occurs, and the signals can be transmitted efficiently without mutual interference.

Figure 2:
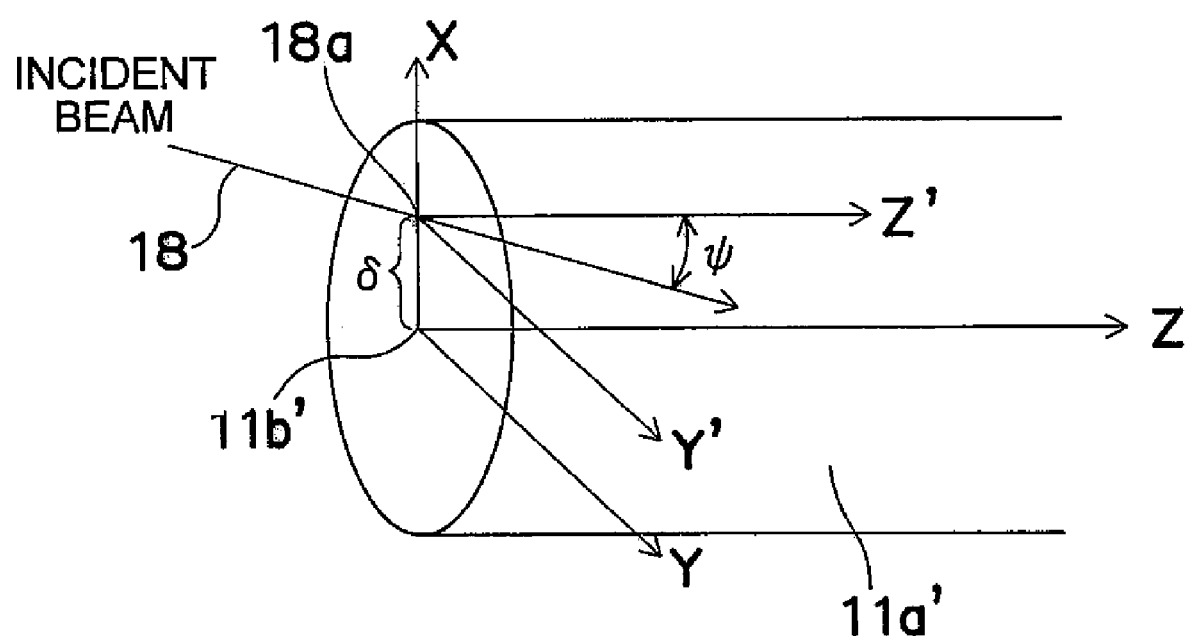
FIG. 2 is a schematic diagram showing an incident direction of a light beam into the second optical fiber.

FIG. 2 is a conceptual diagram of incident direction when the light enters the multimode optical fiber 11'. Suppose the direction linking the incident position 18a of light beam and the core central position 11b' to be X-axis, the axial direction of optical fiber 11' to be Z-axis, and the direction at right angle to X-axis and Z-axis to be Y-axis. Suppose the distance between the incident position 18a of the light beam and the core central position 11b' to be δ, the axis of Y axis deviated by δ in X-axis direction to be Y'-axis, and the axis of Z-axis deviated by δ in X-axis direction to be Z'-axis.

In the optical connector 10 of the embodiment, the eccentricity δ of the core central position 11b of optical fiber core 11 to the core center 11b' of optical fiber 11' is preferred to be defined in a range of 10 to 25 μm. If the eccentricity amount δ is less than 10 μm, the eccentric effect is not obtained, and the light may get into the dimple-like portion low in refractive index in the central area of the multimode optical fiber 11', and abnormal dispersion of modes occurs. If the eccentricity amount δ is more than 25 μm, since the core diameter of the multimode optical fiber 11' is 50 μm or 62.5 μm, the incident light may run out of the core portion, and the light may not be propagated correctly. A more desired effect is obtained by adjusting the eccentricity amount in a range of 15 to 20 μm.

Preferably, the incident beam 18 from the optical fiber 11 enters the optical fiber 11' at an angle ψ of 3 to 25 degrees to its axial center. If the angle ψ is less than 3 degrees, angle shifting effect is not obtained, and the light may get into the dimple-like portion low in refractive index in the central area of the multimode optical fiber 11', and abnormal dispersion of modes occurs. If the angle ψ is more than 25 degrees, the incident angle is too large, and the light once correctly entering the core portion may escape to the clad portion, and the light may not be propagated correctly. A more desired effect is obtained by adjusting the angle ψ in a range of 5 to 15 degrees.

More preferably, as shown in FIG. 2, the incident beam 18 from the optical fiber 11 should advance in a plane formed between Y'-axis and Z'-axis.

Figure 3:
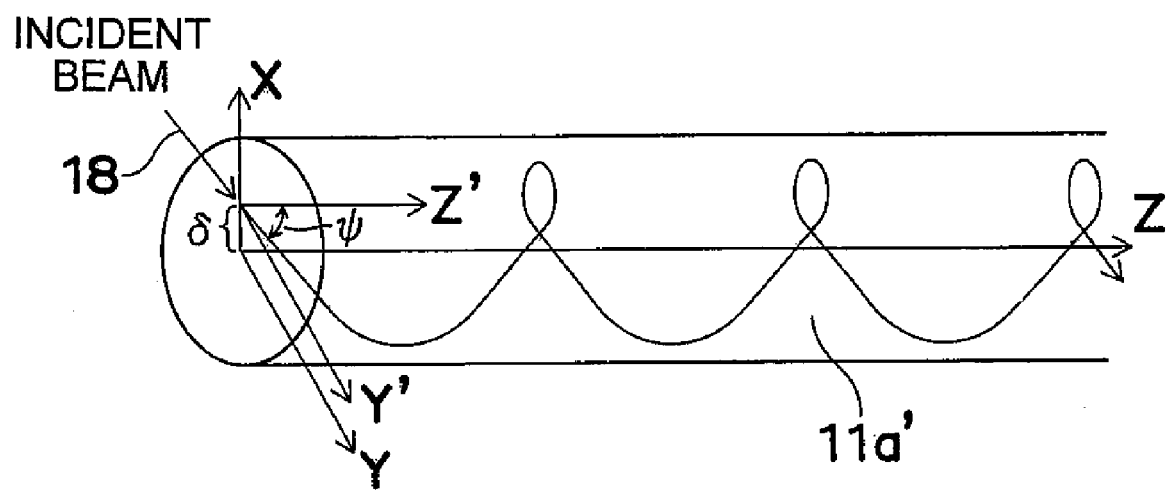
FIG. 3 is a schematic diagram showing an incident direction of a light beam into the second optical fiber.

Thus, together with by setting the core central position 11b of the single mode optical fiber 11 eccentric relatively by δ, and inclining the incident beam 18 from the single mode optical fiber 11 by angle ψ, as shown in FIG. 3, the light entering the core 11a' of the multimode optical fiber of graded index type propagates spirally. As a result, the optical signal is transmitted while evading the dimple-like portion low in refractive index in the central area of the multimode optical fiber 11'. Therefore, occurrence of abnormal dispersion of modes is suppressed more effectively, and a high speed signal can be transmitted in a longer distance (for example, longer than 550 m).

In the optical connector of the embodiment, a pair of ferrules are bonded by a bent sleeve, and the axial hole of at least one ferrule is set eccentric, and the optical fibers are connected to each other. In this manner, the optical fibers can be easily connected without requiring any particular processing. In the explanation made so far, the single mode optical fiber 11 is fixed in the center of the ferrule 1, and the multimode optical fiber 11' is fixed away from the center of the ferrule 1'. However, the configuration is not specified as far as the core central positions 11b', 11b' of the single mode optical fiber 11 and the multimode optical fiber 11' are deviated from each other.

The material of ferrules 1, 1' includes zirconia, alumina, other ceramics, glass, stainless steel, othermetals, LCP, PPS, PES, PEI, other plastics, or mixed materials of them.

The structure of sleeve 14 may be split sleeve having a slit in the longitudinal direction, or precision sleeve without slit, etc. The material of sleeve 14 may be zirconia, phosphor bronze, plastics, etc. Processing method of sleeve 14 is material cutting or injection molding. In particular, injection molding of plastics is preferred because any complicated shape can be manufactured at a relatively low cost.

Embodiment 2

In this embodiment, the invention is applied in a mode conditioner. The mode conditioner of the embodiment has a junction of fusing and bonding one end of the single mode optical fiber and one end of the multimode optical fibers and a patching cord having an optical connector is provided at other end of the both. The central positions of cores at the junction are set eccentric mutually, and the central axes of the cores are inclined, and fused and adhered.

Figure 4A:
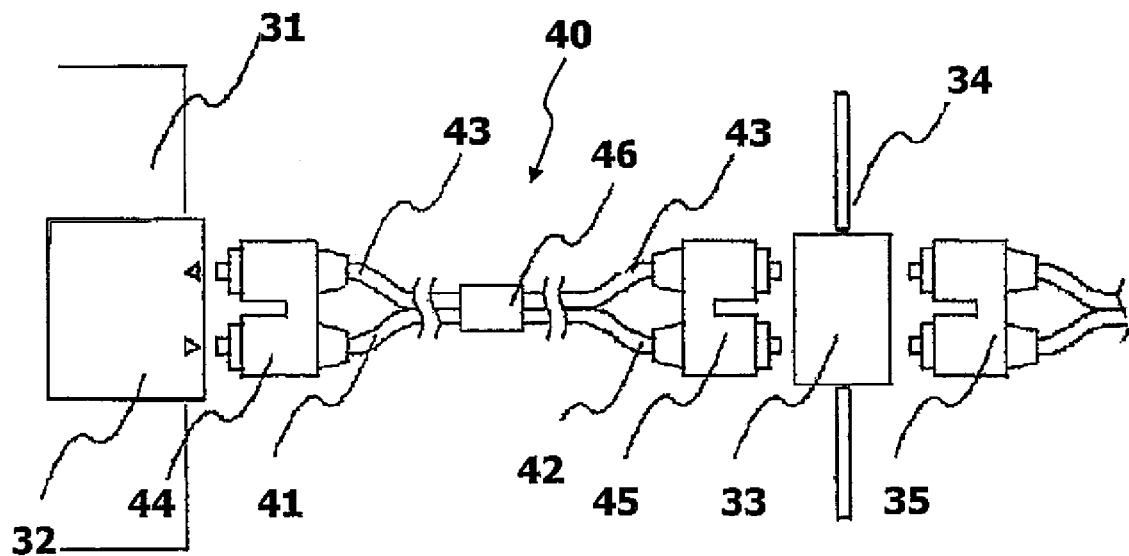
FIG. 4A is a schematic diagram of a mode conditioner in embodiment 2.

FIG. 4A is a block diagram of mode conditioner 40 of the embodiment. The mode conditioner 40 of the embodiment is a mode conditioner 40 of patching cord type for bonding to an integral type optical transceiver 32. The patching cord is a fiber code that has optical connecters on both ends. In the embodiment shown in FIG. 4A, a short distance from a transmitting device 31 such as LAN device to an optical fiber end panel (patch panel) 34 is connected by a patching code. A dual mode conditioner 40 shown in FIG. 4A has a structure of bonding twin optical connectors 44 and 45 by means of two patching cords. In the midst of patching cords, a junction 46 for optical cords is provided. The optical connector 44 is detachably connected to the optical transceiver 32 having laser light source. The optical connector 45 is detachably connected to the patch panel 34. Optical fiber cord for transmission 35 is detachably connected to the patch panel 34.

The patching cord connected to the optical receiver side of the optical transceiver 32 is composed of the multimode optical fiber 43. On the other hand, the patching cord connected to the optical transmitter side of the optical transceiver 32 is composed by connecting the single mode optical fiber 41 and the multimode optical fiber 42. The single mode optical fiber 41 is disposed at the optical transceiver 32 side. The mode conditioner of the present invention may be equipped only with an optical transmitter.

The single mode optical fiber 41 and the multimode optical fiber 42 are connected same as in embodiment 1. That is, at the junction 46, the centers of cores are mutually eccentric, and central axes of cores are mutually inclined, and fused and adhered. Therefore, the light entering the single mode optical fiber 41 from the optical transceiver 32 is deviated from the core center of the multimode optical fiber 42 when the multimode optical fiber 42, and enters obliquely to the optical axis of the multimode optical fiber. That is, the light enters in the higher mode alone. Hence the light rarely enters the dimple-like portion low in refractive index in the core center, and abnormal dispersion of modes is suppressed. Therefore signals can be transmitted efficiently by preventing mutual signal interference.

In this embodiment, too, the eccentricity δ of the core central position of the single mode optical fiber 41 to the core center of the multimode optical fiber 42 is preferred to be 10 to 25 μm, or more preferably 15 to 20 μm. The angle ψ of incident beam from the single mode optical fiber 41 to the axial center of the multimode optical fiber 42 is preferred to be 3 to 25 degrees, or more preferably 5 to 15 degrees. Further, as shown in FIG. 2, the incident beam from the single mode optical fiber 41 preferably advances in a plane formed between Y'-axis and Z'-axis.

Figure 4B:
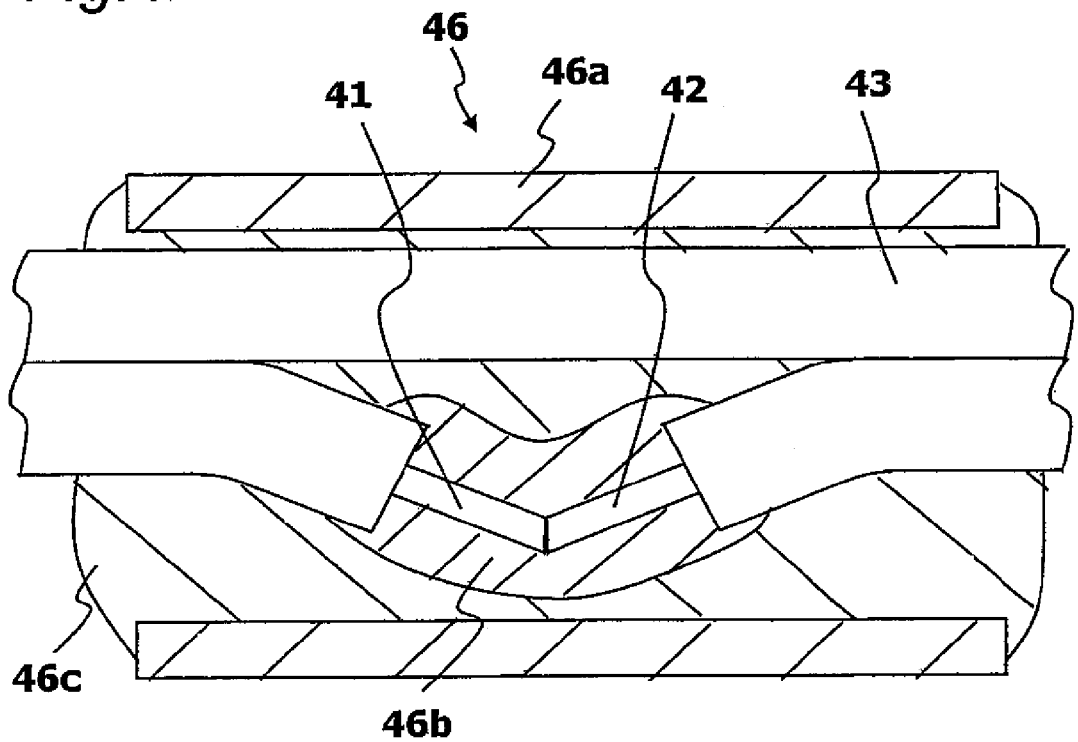
FIG. 4B is a partially magnified sectional view of connecting portion of optical fibers of the mode conditioner in FIG. 4A.

FIG. 4B is a partially magnified sectional view of connecting portion 46 provided in the midst of patching cord. The multimode optical fiber 43 is patching cord at the light reception side directly penetrates through the connecting portion 46. On the other hand, the single mode optical fiber 41 and the multimode optical fiber 42 for composing the patching code at the light transmission side are mutually fused and bonded in the junction 46. The surrounding of fusing and bonded area of the single mode optical fiber 41 and the multimode optical fiber 42 is fixed by a reinforcing member 45b. The entire connecting portion is covered with connection sleeve 46a, and the inside of the connection sleeve 46a is filled with filler 46c.

The connection sleeve 46a is composed of, for example, alumina, zirconia, other ceramics, stainless steel, other. metals, crystallized glass or other glass materials. Any material may be used as far as rigidity is high. The shape of connection sleeve 46a is not particularly specified. For example, the connection sleeve 46a may be processed in a cylindrical pipe easily, and the cost may be reduced.

The reinforcing member 46b protects the fusing and bonding portion of optical fibers, and is preferred to be somewhat high in rigidity. However, the junction may be broken if attempted to fix the fusing and bonding portion mechanically by the reinforcing member 46b of high rigidity. It is hence preferred to form the reinforcing member 46b by coating with covering material of optical fiber, such as nylon 66, polyester elastomer or other resin. In this forming method of reinforcing member 46b, a commercial recoater for fused ceramics maybe used. Hence, the reinforcing member 46b of high reliability can be formed easily and at low cost.

The filler 46c is used for fixing the inner circumference of connection sleeve 46a and outer circumference of reinforcing member 46b. The material of filler 46c includes epoxy adhesive, ultraviolet curing adhesive, photo effect adhesive, and other adhesives. It is particularly preferred to use silicon adhesive for the filler 46c.

The mode conditioner 40 may be used together with any transmission fiber, such as the multimode optical fiber without abnormal refractive index distribution shown in FIG. 19B. Mode conditioner is not required at the reception side. Therefore, the reception side patching cord may be composed of one multimode optical fiber 43 such as ordinary optical jumper, and optical connectors 44, 45 can be connected at both ends. As reception side patching cord, for example, the multimode optical fiber 43 may be fused without deviating the cores at the junction 46.

Embodiment 3

In this embodiment, the invention is applied in an optical transmitter with a mode conditioner. The optical transmitter of the embodiment has a split sleeve disposed on the optical axis of laser diode, and a fiber stab having a single mode optical fiber is inserted at the light incident side of the split sleeve, while a plug ferrule having an optical fiber is inserted at the light exit side. The fiber stab and plug ferrule can abut against each other at opposite ends. The single mode optical fiber in the fiber stab and arbitrary optical fiber in the plug ferrule are connected to each other, with the central positions of the cores being deviated relatively, and the mutual optical axes being inclined.

FIG. 5A is a sectional view of the optical transmitter of the invention. The optical transmitter in FIG. 5A has a laser diode 51, and it is designed to realize optical transmission by connecting to a plug ferrule 55 having a multimode optical fiber 56. The optical transmitter 50 comprises a semiconductor laser unit 62 accommodating a semiconductor laser 51, and an optical receptacle 64 for inserting a plug ferrule 55. The optical receptacle 64 includes a metal holder 63 a fiber stab 52 having a single mode optical fiber 53 in a through-hole, and a split sleeve 54. The fiber stab 52 has its rear end fitting into the through-hole of the metal holder 63, and the light emitted from the semiconductor laser 51 enters here. The split sleeve 54 for inserting the plug ferrule 55 is fitted to the leading end of the fiber stab 52. The both ends of the fiber stab 52 is polished. The fiber stab 52 is preferably composed of zirconia ceramics. The split sleeve 54 is also made of zirconia ceramics, preferably.

The split sleeve 54 is disposed on the optical axis 61 of a laser diode 1. The fiber stab 52 inserted at the incident side of the split sleeve 54 abuts against the plug ferrule 55 inserted from the exit side of the split sleeve 54. The single mode optical fiber 53 in the fiber stab 52 and the multimode optical fiber 56 in the plug ferrule 55 are optically connected, and the light emitted from the laser diode 51 enters the multimode optical fiber 56. That is, the light from the laser diode 51 passes through the fiber stab 52 made of zirconia ceramics before entering the multimode optical fiber 56. At this time, the core center of the single mode optical fiber 53 and the core center of the multimode optical fiber 56 are mutually deviated. The optical fibers are connected so that the optical axis of the single mode optical fiber 53 may be inclined to the optical axis of the multimode optical fiber 56.

FIG. 5B is a partially magnified view showing the junction of optical fibers in the optical transmitter shown in FIG. 5A. As shown in FIG. 5B, the through-hole 52a of fiber stab 52 spreads near the interface with the plug ferrule 55. In the expanded portion 52a of through-hole, the single mode optical fiber 53 is bent and the adhesive 59 is cured. When the plug ferrule 55 abuts against such fiber stab 52, the center of core 53a of the single mode optical fiber and the center of core 56a of the multimode optical fiber are mutually deviated. At the same time, the optical axis of the single mode optical fiber 53 is inclined to the optical axis of the multimode optical fiber 56. For example, the leading end of the single mode optical fiber 53 is bent so that the core center of the single mode optical fiber 53 may be deviated by about 20 µm from the core center of the multimode optical fiber 56, and that the light emitted from the single mode optical fiber 53 may enter the multimode optical fiber 56 by inclining about 10 degrees to its optical axis. As a result, the transmission light passing through the core of the single mode optical fiber 53 enters the multimode optical fiber 56 by deviating about 20 µm from its optical axis and inclining by about 10 degrees. Therefore, the light does not get into the portion of low refractive index in the central area of the multimode optical fiber 56, or if entering, it is a very small amount, and deterioration of transmission characteristic by band deterioration due to DMD can be avoided. That is, as shown in FIG. 3, optical signal propagates spirally in the core of the multimode optical fiber of graded index type, and light is transmitted by avoiding the dimple-like portion low in refractive index in the central area of the multimode optical fiber. Therefore, abnormal dispersion of mode is suppressed, and signal interference is prevented. Hence, optical transmission at high speed and in long distance (for example, 550 m or more) is realized.

A high speed optical data transmission system using the multimode optical fiber 56 can be realized at low cost. This mode conditioner may be also used in the transmission fiber using the multimode optical fiber not having abnormal refraction index distribution as shown in FIG. 19B. In the case of optical transmitter with the mode conditioner as in this embodiment, as compared with the mode conditioner of patching cord type in embodiment 2, the following advantages are obtained. That is, in the optical transmitter with the mode conditioner of this embodiment, it does not require difficult operation of fusing and connecting by deviating the core centers of the single mode optical fiber and the multi-mode optical fiber. After fusing the strands of optical fiber, it does not require the operation of connecting cabler or reinforcing member or covering the connection parts. Further, it is not required to manage the special patching cords by distinguishing from ordinary patching cords, and the system construction is much easier.

In this embodiment, too, the eccentricity δ of the core central position of the single mode optical fiber 53 to the core center of the multimode optical fiber 56 is 5 to 30 µm, more preferably 10 to 25 µm, and most preferably 15 to 20 µm. The angle ψ of incident beam from the single mode optical fiber 53 to the axial center of the multimode optical fiber 56 is 3 to 25 degrees, or preferably 5 to 15 degrees. Further, as shown in FIG. 2, the incident beam from the single mode optical fiber preferably advances in a plane formed between Y'-axis and Z'-axis.

The material of fiber stab 52 and plug ferrule 55 includes zirconia, alumina, other ceramics, glass, stainless steel, other metals, LCP, PPS, PES, PEI, other plastics, or mixed materials of them. The structure of the split sleeve 54 may be a sleeve having a slit in the longitudinal direction, or a precision sleeve without a slit. The material of the split sleeve 54 may be zirconia, phosphor bronze, plastics, etc. Processing method of the split sleeve 54 is material cutting or injection molding used in plastics. In particular, injection molding is preferred because any complicated shape can be manufactured at a relatively low cost.

Variations of connection method of the single mode optical fiber 53 and the multimode optical fiber 56 are explained.

Figure 6:
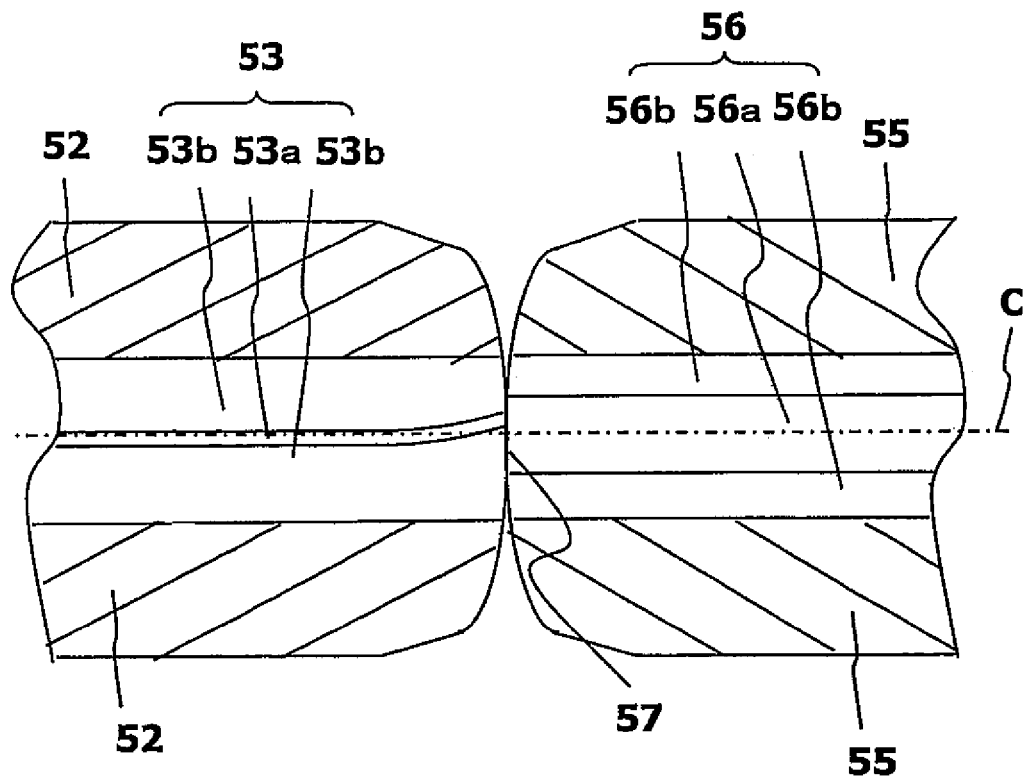
FIG. 6 is a partially magnified sectional view showing other example of connecting portion of optical fibers.
Figure 7:
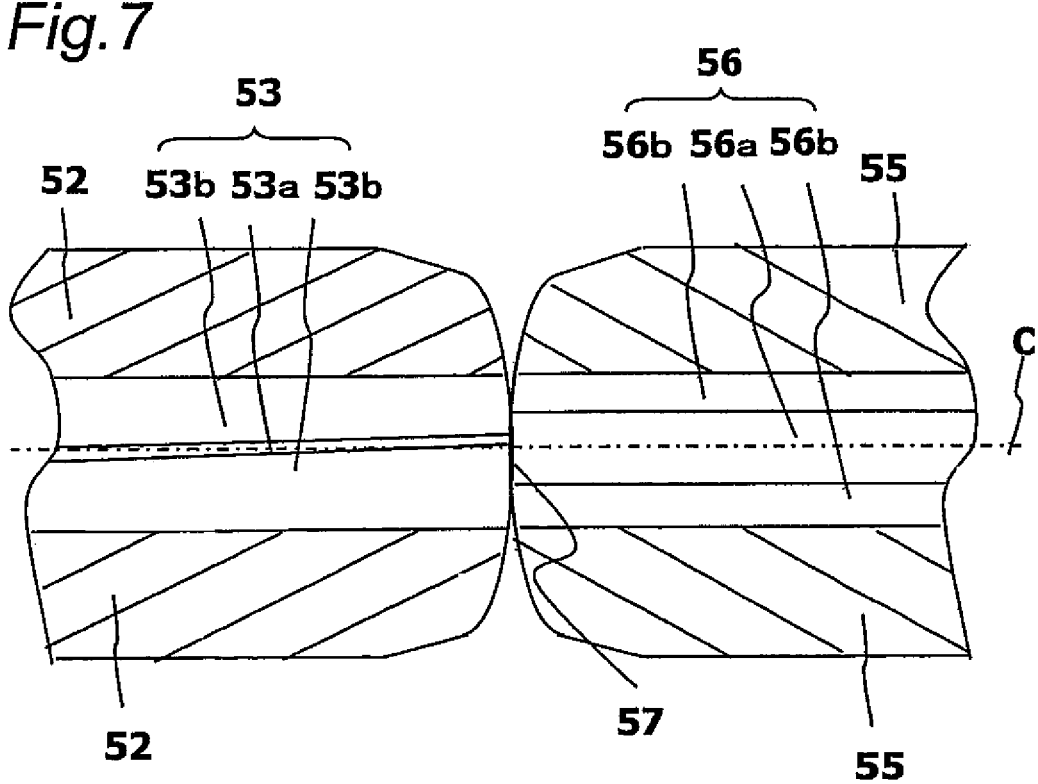
FIG. 7 is a partially magnified sectional view showing other example of connecting portion of optical fibers.

FIG. 6 shows an example of bending of only core 53*a* of the single mode optical fiber 53 near the end 57. Such single mode optical fiber 53 can be manufactured, for example, by manufacturing an optical fiber preliminarily in a state of large outer circumference of clad 53*b*, and polishing or etching the outer circumference of the clad 53*b* while bending the leading end of the optical fiber. FIG. 7 shows an example of the single mode optical fiber 53, of which core 53*a* is entirely formed obliquely to the outer circumference of the clad 53*b*. Such single mode optical fiber 53 can be manufactured by polishing or etching after manufacturing an optical fiber of large outer circumference of the clad 53*b*.

Figure 8:
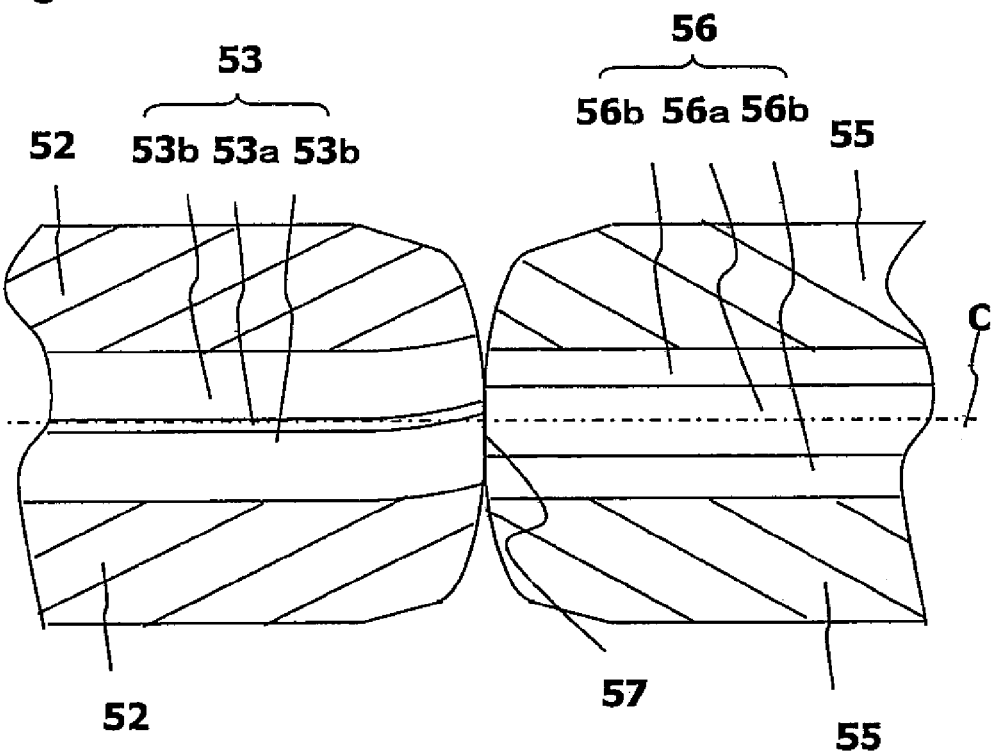
FIG. 8 is a partially magnified sectional view showing other example of connecting portion of optical fibers.

FIG. 8 shows bending of the inner hole 52*a* near end 57 of the fiber stab 52. Such bent inner hole 52*a* is formed as follows. First, using YAG laser processing machine, an inner hole is engraved along the axial center from the end of incident side of the fiber stab 52, and stopped before penetrating to other end. Starting from a position deviated from the axial center, from the exit side end of the fiber stab 52, a hole is opened obliquely toward the axial center, until communicating with the formed inner hole.

Figure 9:
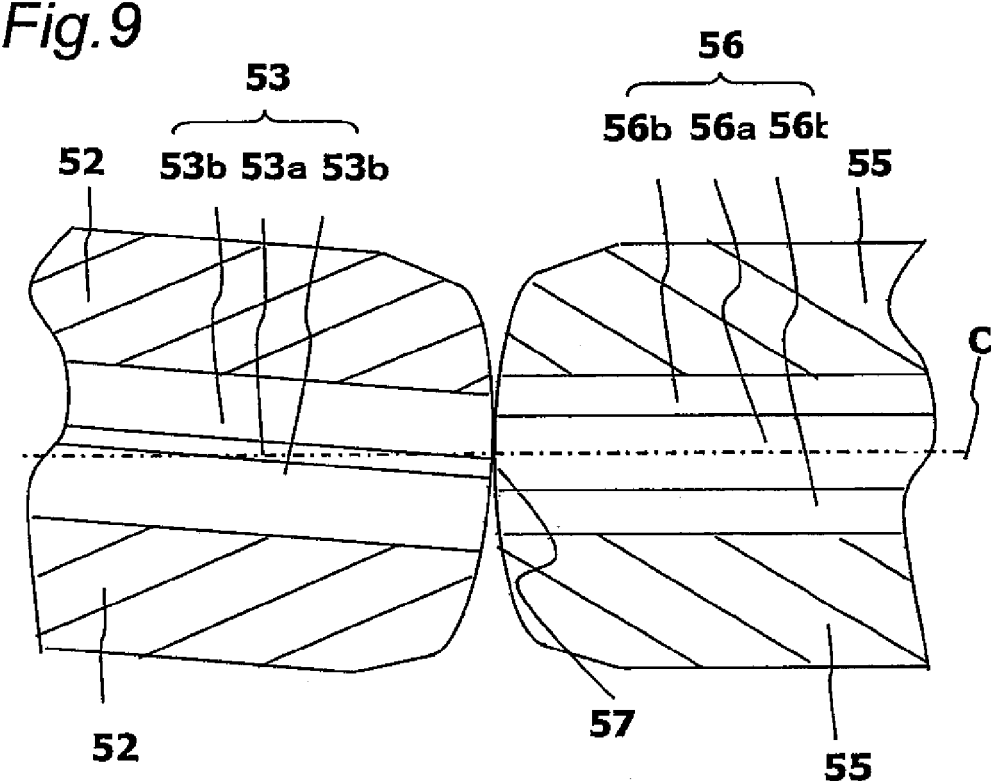
FIG. 9 is a partially magnified sectional view showing other example of connecting portion of optical fibers.

FIG. 9 shows the core center of the single mode optical fiber 53 and the core center of the multimode optical fiber 56 are deviated by inclining the fiber stab 52 itself to the plug ferrule 55. Alternatively, the plug ferrule may be inclined to the fiber stab 52.

Figure 10:
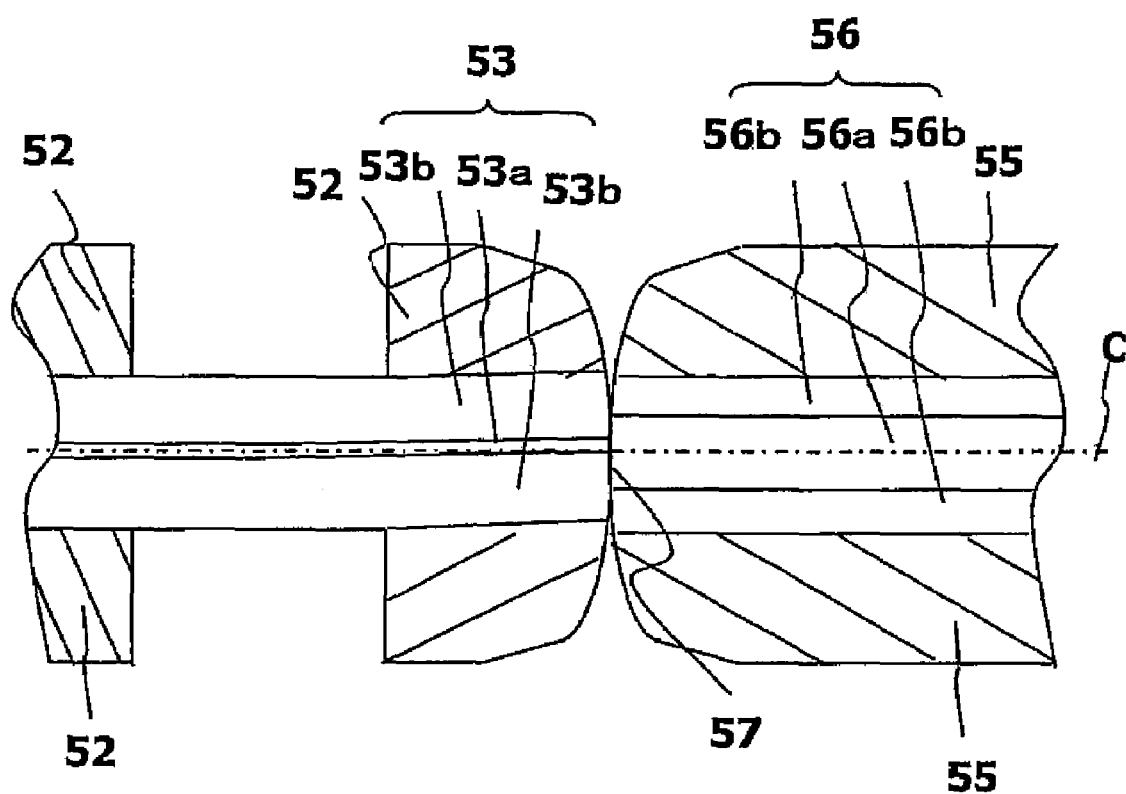
FIG. 10 is a partially magnified sectional view showing other example of connecting portion of optical fibers.

FIG. 10 shows the fiber stab 52 is cut in two sections. In the incident side fiber stab 52', an inner hole is formed along the axial center, and in the exit side fiber stab 52", an inner hole is formed obliquely to the axial center. In the space between the incident side fiber stab 52' and the exit side fiber stab 52", the single mode optical fiber 53 is straightened. If, however, the optical fiber 53 may be broken due to thermal expansion of members, the optical fiber may be deflected in this portion.

Embodiment 4

In this embodiment, in the optical transmitter with the mode conditioner explained in embodiment 3, an example of providing the single mode optical fiber with means for suppressing a clad mode light is explained.

By using eliminating means of the clad mode light, the coupled power ratio (CPR) can be enhanced. The CPR is a difference in optical output between when the plug ferrule 55 having the multimode optical fiber is inserted in the optical transmitter shown in FIG. 5A, and when the plug ferrule 55 having the single mode optical fiber is inserted in the same optical transmitter. The CPR is a reference value showing whether the light is entering by evading sufficiently the center of the multimode optical fiber 56 or not.

By using the optical transmitter disclosed in Japanese Patent Application Laid-Open No. 2000-147334, in order to satisfy the CPR standard of gigabit Ethernet (registered trademark) of IEEE, the length of eccentric single mode optical fiber (=length of fiber stab) must be sufficiently long (for example, 2 cm or more), as known from measurements. If the length of fiber stab is short, the light entering the clad of the eccentric single mode optical fiber is not attenuated sufficiently, but is coupled to the multimode optical fiber, and is coupled near the center of the multimode optical fiber. However, the substrate length of optical transceiver for gigabit Ethernet (registered trademark) is only about 2 to 3 cm, and it is difficult to mount an optical transmitter of long fiber stab on this substrate.

In the optical transmitter of embodiment 3, by providing the clad 53*b* of the single mode optical fiber 53 with eliminating means of the clad mode light, the optical signal entering the clad 53*b* can be attenuated, and entry into the multimode optical fiber 56 can be prevented. Therefore, the CPR can be improved without extending the length of the fiber stab.

The clad mode light eliminating means may be realized by various structures as explained below.

Figure 11:
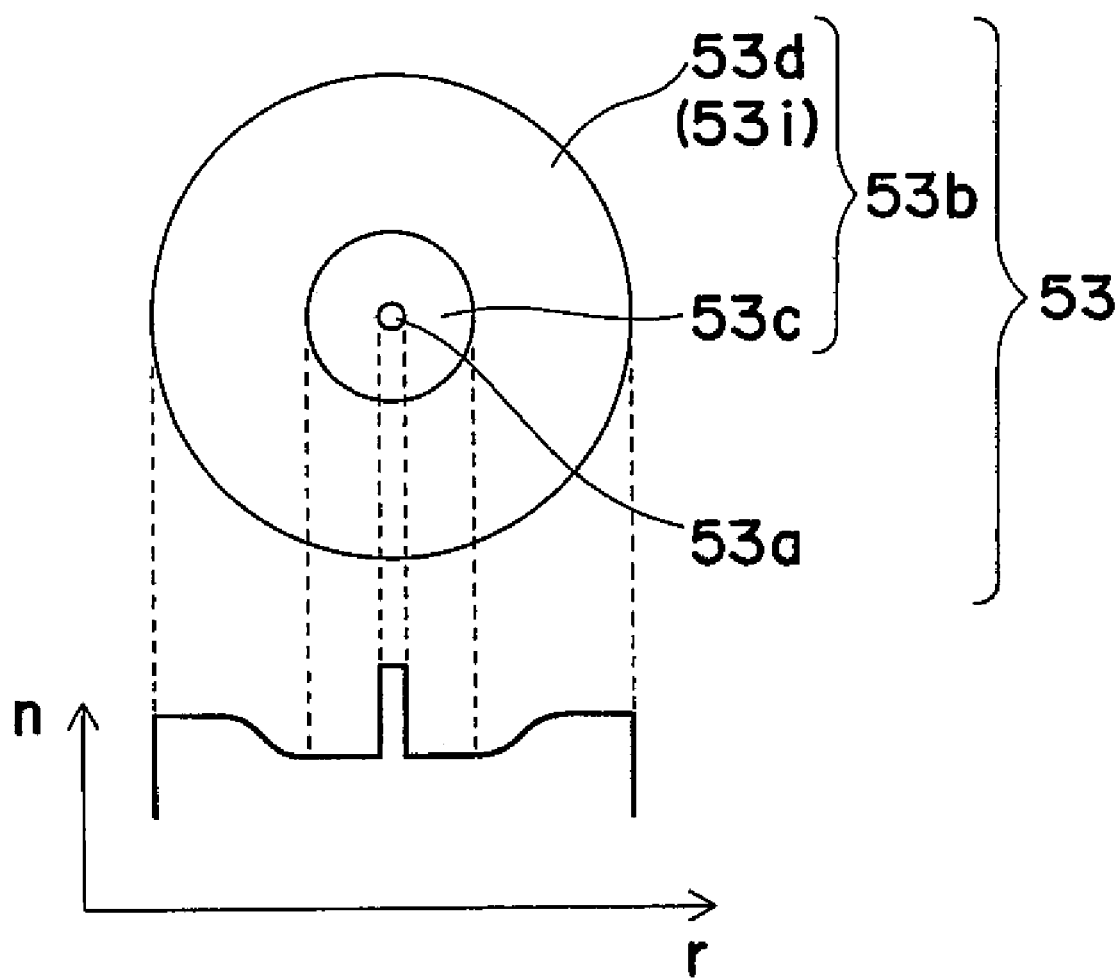
FIG. 11 is a sectional view of a single mode optical fiber having eliminating means of a clad mode light, and a schematic diagram showing refractive index distribution corresponding to this section.

In the single mode optical fiber 53 shown in FIG. 11, the outside clad 53*d* is larger in refractive index than the inside clad 53*c*. At least inpart of high refractive index clad portion 53*d*, a light attenuating dopant region containing dopant for attenuating optical signal is formed.

As shown in FIG. 11, the single mode optical fiber 53 is composed of a core 53*a* for propagating light, an inside clad 53*c*, and an outside clad 53*d* as absorbing portion of clad mode. Specifically, for example, it may be formed as follows. In the core 53*a*, for example, GeO2 is doped in quartz glass in order to add a refractive index difference from the clad 53*b*. The core diameter of the single mode optical fiber 53 is 8 μm, and the relative refractive index difference between the core 53*a* and the inside clad 53*c* is, for example, 0.3%. At this time, the breakage wavelength is about 1.1 μm. Further, in order to attenuate the intensity of optical signal, Co (cobalt) is doped in the core 53*a*. The content of Co is adjusted so as to obtain light attenuation amount of 30 dB at optical fiber length of 22.4 mm and wavelength of 1.31 μm. The inside clad 53*c* is made of pure quartz glass, and its outside diameter is, for example, about 40 μm. In the outside clad 53*d*, same as in the core 53*a*, GeO2 is doped, and the GeO2 concentration is gradually increased in radial direction from inside, and the concentration near the outer circumference is adjusted to be nearly constant at the relative refractive index difference of 0.15%. The outside diameter is 125 μm, same as in standard optical fiber. The relative refractive index difference from the core of outside clad 53*d* is about half of the relative refractive index difference from the core of the inside clad 53*c*, but since it is sufficiently remote from the core 53*a*, there is no effect on the optical signal propagating through the core 53*a*.

Figure 12:
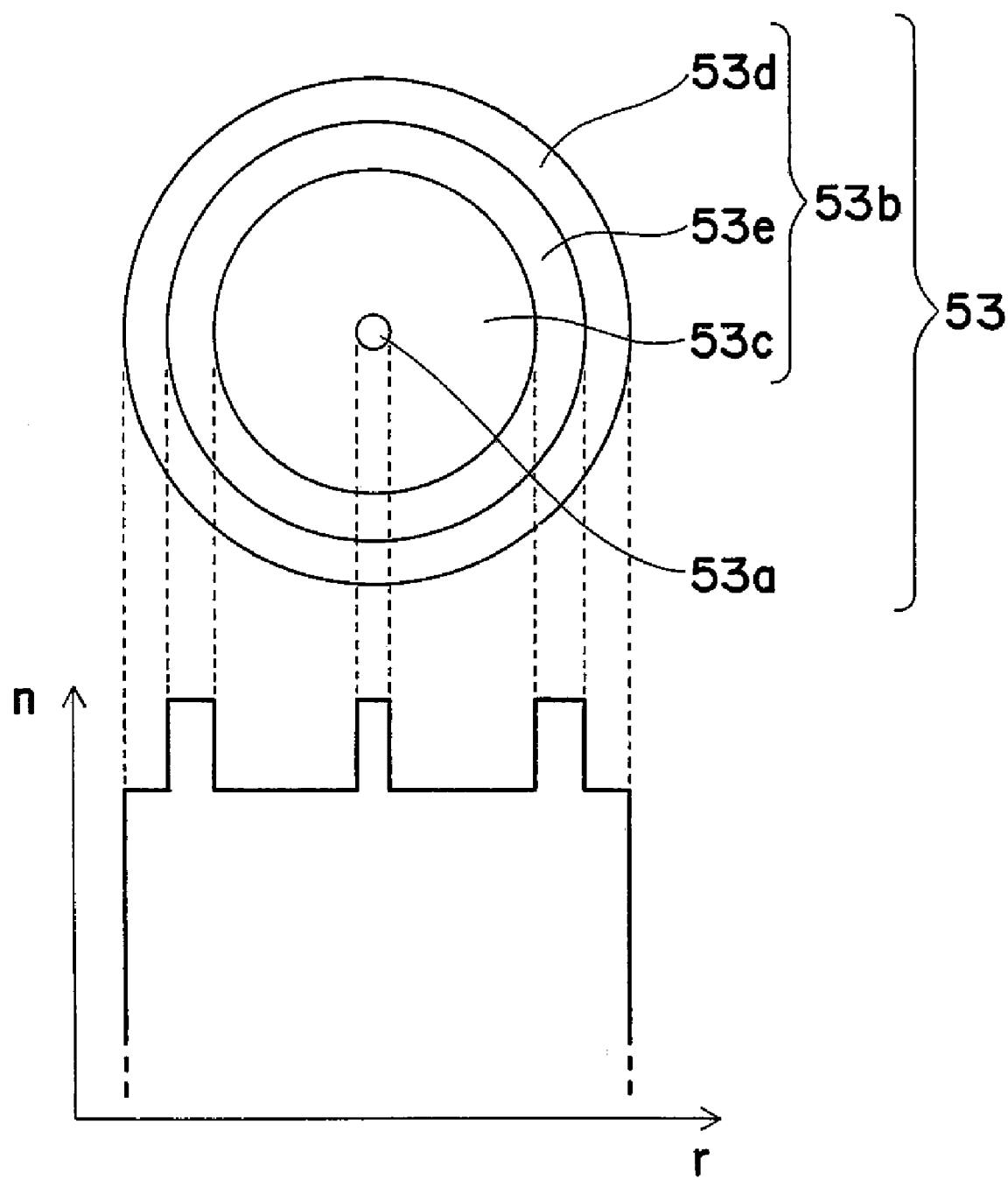
FIG. 12 is a sectional view of a single mode optical fiber having eliminating means of a clad mode light in other example, and a schematic diagram showing refractive index distribution corresponding to this section.

The single mode optical fiber 53 in FIG. 12 has an intermediate clad 53*e* having same refractive index as the core 53*a* as eliminating means of the clad mode light, between the outside clad 53*d* and the inside clad 53*c* of the single mode optical fiber 53. The outside clad 53*d* and the inside clad 53*c* may have a refractive index of general clad.

Specifically, the structure may be composed as follows. In the core 53*a*, GeO2 is doped in quartz glass in order to add refractive index difference from the clad 53*b*. The relative refractive index difference of the core 53*a* and the inside clad 53*c* is 0.3%, and the diameter of the core 53*a* is 8 μm. The breakage wavelength is about 1.1 μm. The inside clad 53*c* contains V (vanadium) in order to attenuate the intensity of optical signal. The content of V is adjusted so as to obtain light attenuation amount of 20 dB at optical fiber length of 22.4 mm and wavelength of 1.31 μm. The inside clad 53*c* and the outside clad 53*d* are made of pure quartz glass, the outside diameter of the inside clad 53*c* is about 75 μm, and the outside diameter of the outside clad 53*d* is 125 μm, same as in standard optical fiber. In the intermediate clad 53*e* acting as means for the eliminating clad mode light, GeO2 is doped same as in the core 53a, and the relative refractive index difference from the inside clad layer 53c or the outside clad layer 53d is set almost constant at 0.3%. The outside diameter of the intermediate clad 3e is 100 μm. As a result, the clad mode light goes out of the intermediate clad 53e.

Figure 13:
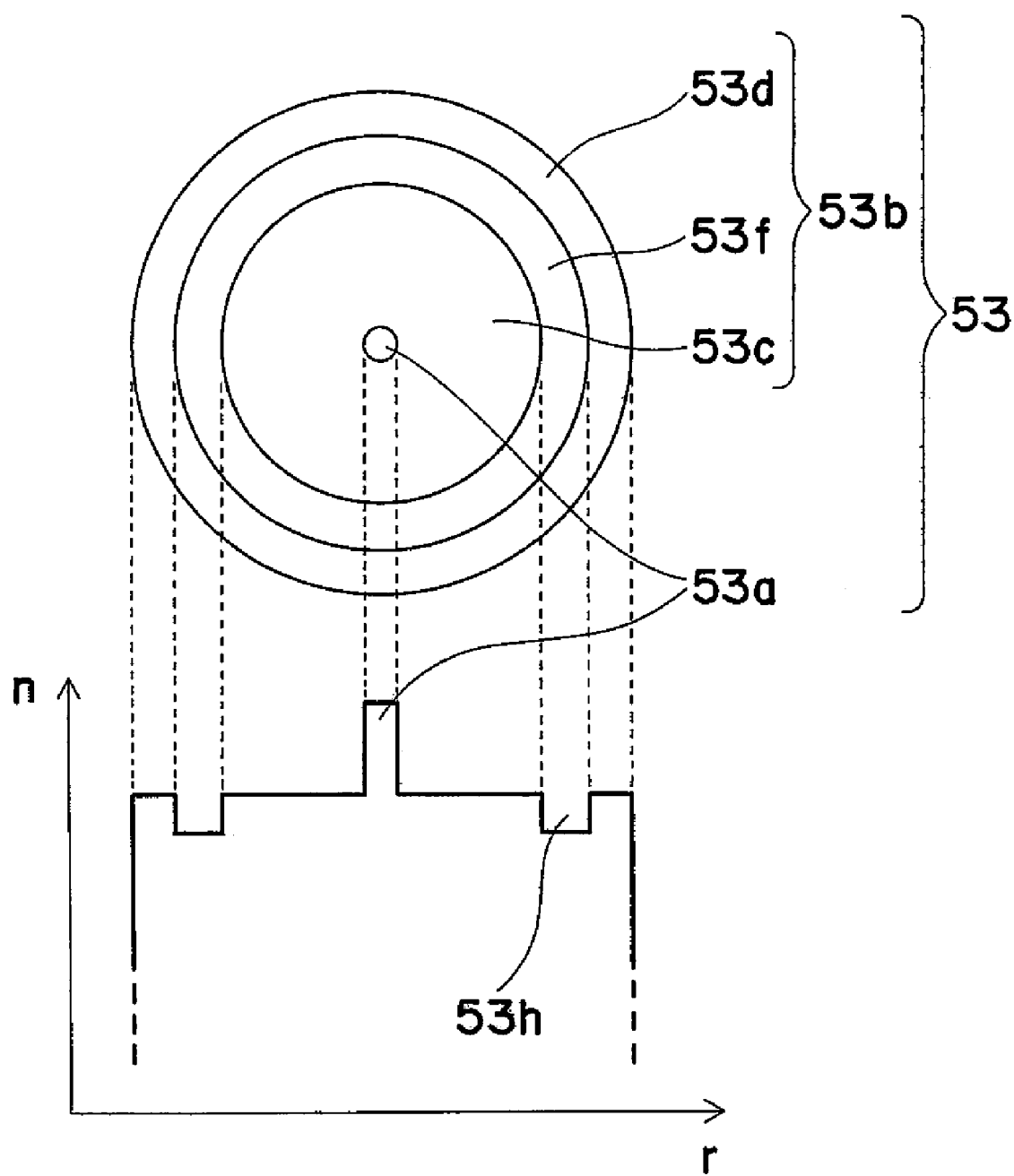
FIG. 13 is a sectional view of a single mode optical fiber having eliminating means of a clad mode light in other example, and a schematic diagram showing refractive index distribution corresponding to this section.

The single mode optical fiber 53 in FIG. 13 has an intermediate clad 53f having smaller refractive index than in the outside clad 53d or the inside clad 53c, provided between the outside clad 53d or the inside clad 53c. This intermediate clad layer 53f is eliminating means of the clad mode light.

Specifically, for example, the structure is as follows. In the core 53a, GeO2 is doped as dopant in quartz glass in order to add refractive index difference from the inside clad 53c. The core diameter is 8 μm, and the relative refractive index difference of the core 53a and the inside clad 53c is 0.3%. At this time, the breakage wavelength is about 1.1 μm. The inside clad 53c is a clad mode capturing part, and is doped almost uniformly with Co as dopant, and its outside diameter is about 40 μm. The outside clad 53d is made of pure quartz glass, and its outside diameter is 125 μm, same as in standard optical fiber. The low refractive index portion 53f is a layer uniformly doped with F (fluorine) in a width of 15 μm, in the outside of the inside clad 53c, and inside of the outside clad 53d. The concentration of F is adjusted so that the relative refractive index may be almost constant at −0.15%. Since the low refractive index portion 53f is away from the core 53a, there is almost no effect on the optical signal propagating in the core 53a. The optical signal advancing in the inside clad 53c is entrapped in the inside clad 53c.

Figure 14:
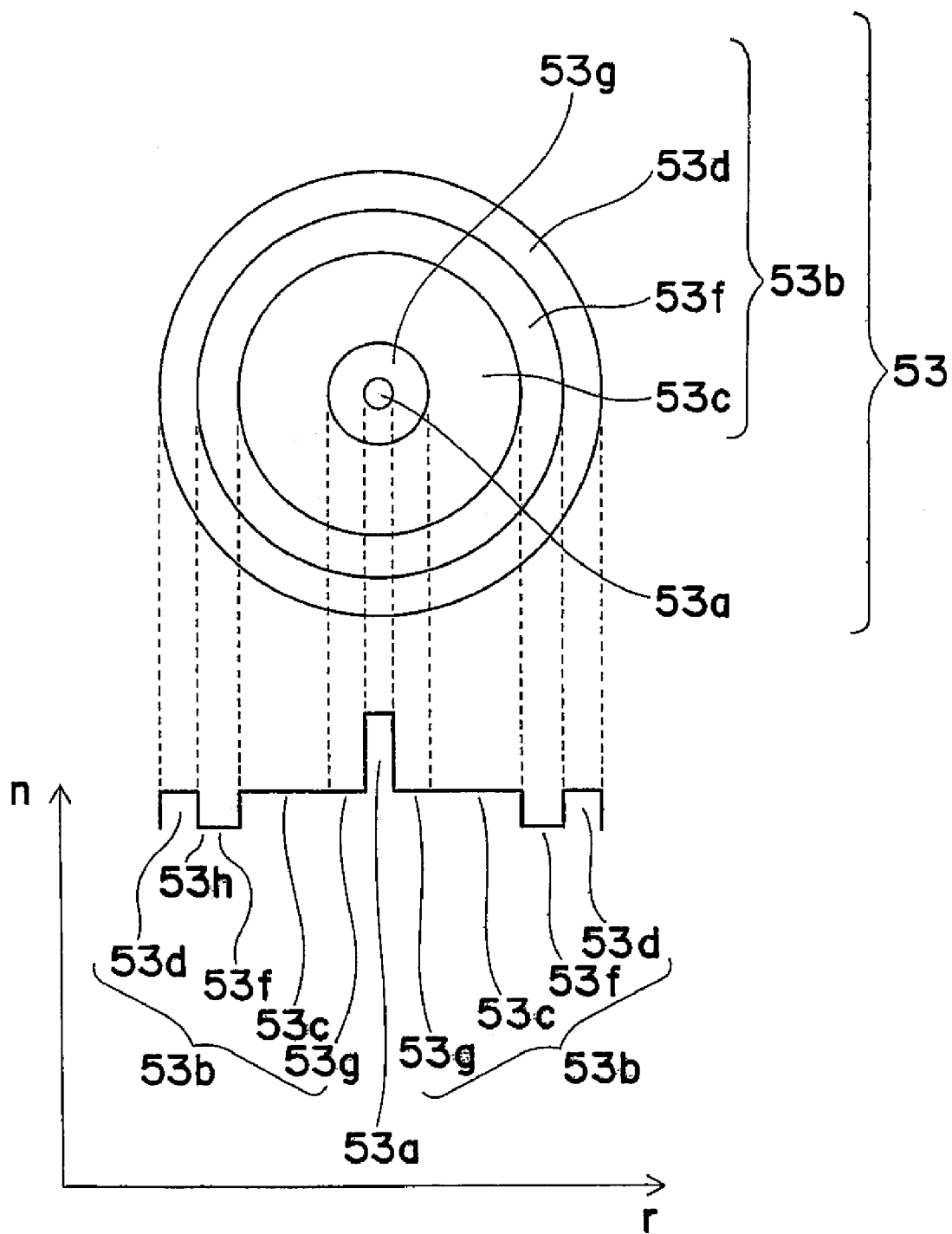
FIG. 14 is a sectional view of a single mode optical fiber having eliminating means of a clad mode light in other example, and a schematic diagram showing refractive index distribution corresponding to this section.

The single mode optical fiber 53 in FIG. 14 has a light attenuation dopant region 53g in the single mode optical fiber in FIG. 13. The light attenuation dopant region 53g is, for example, a region doped with Co (cobalt), and it is a region contacting with the core 53a of the inside clad 53c. Of the region of the inside clad 53c, between the region doping Co and the region not doping Co, there is almost no difference in refractive index distribution. As shown in FIG. 14, in the refractive index distribution, the portion of the core 53a has the largest refractive index. The refractive index of the intermediate clad layer 53f (low refractive index region) is smaller than that of the inside clad 53c. Therefore, the light signal advancing in the inside clad 53c is entrapped in the inside clad 53c including the light attenuation dopant region 53g, and is also attenuated in the light attenuation dopant region 53g. The doping region of dopant is smaller, and the manufacturing cost is lowered.

Figure 15:
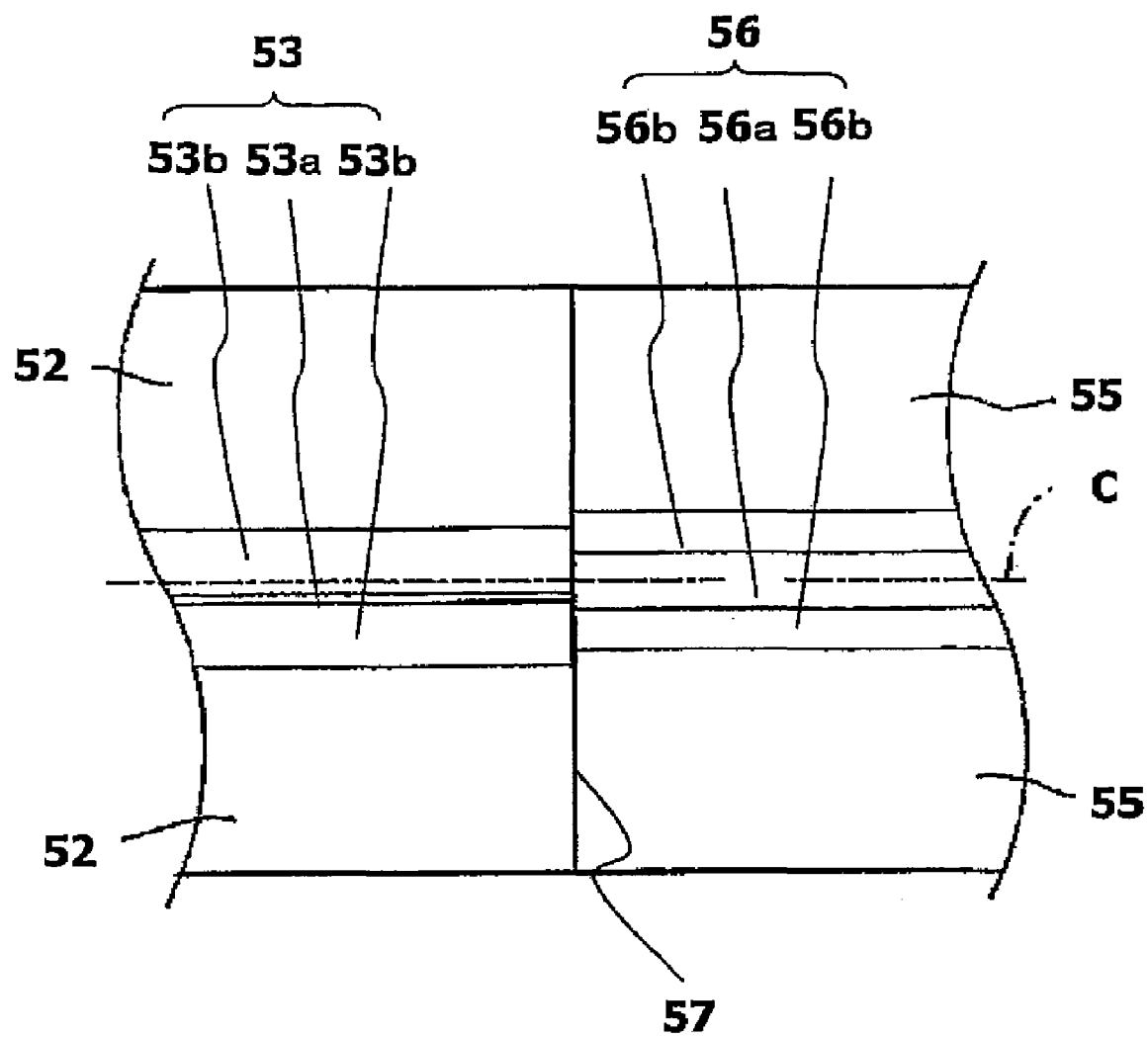
FIG. 15 is a partially magnified sectional view showing an example of connecting portion of optical fibers.
Figure 16:
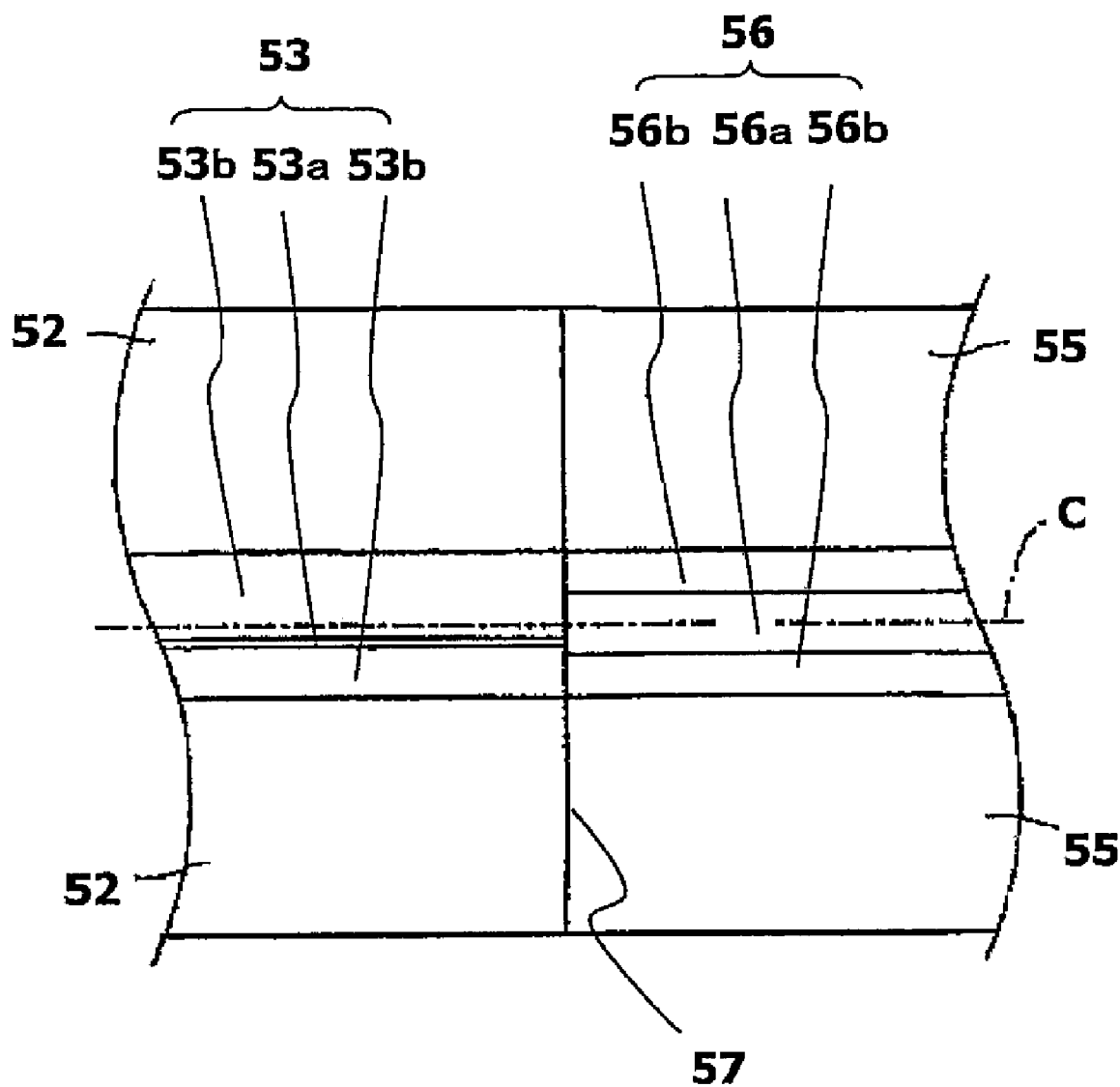
FIG. 16 is a partially magnified sectional view showing other example of connecting portion of optical fibers.

When the single mode optical fiber having such clad mode light eliminating means is used as the fiber stab, the single mode optical fiber 53 in the fiber stab 52 and the multimode optical fiber 56 in the plug ferrule 55 can be connected so that the mutual axes may be parallel to each other. For example, as shown in FIG. 15 or FIG. 16, the center of core 53a of the single mode optical fiber in the fiber stab 52 is set at a position deviated from the center of core 56a of the multimode optical fiber 56 by 5 to 30 μm. However, the single mode optical fiber 53 in the fiber stab 52 and the multimode optical fiber 56 in the plug ferrule 55 are mutually parallel in the optical axes. As shown in FIG. 15, the through-hole of the fiber stab 52 may be set eccentric, or as shown in FIG. 16, the single mode optical fiber 53 with an eccentric core may be used. Since the core center of the single mode optical fiber 53 in the fiber stab 52 is deviated from the core center of the multimode optical fiber 56 in the plug ferrule 55, the transmission light passing through the core of the single mode optical fiber 53 in the fiber stab 52 enters the multimode optical fiber 56 at a position off its center. Accordingly, the light does not enter the portion of low refractive index in the central area of the multimode optical fiber 56, and if entering, the amount is very small, and hence transmission characteristic deterioration due to DMD can be suppressed to a certain extent. Moreover, since the clad 53b of the single mode optical fiber 53 has eliminating means of the clad mode light, the optical signal entering the clad 53b is attenuated, hardly entering the multimode optical fiber 56, so that the CPR may be improved.

EXAMPLES

Example 1

The following experiment was conducted by using the optical connector shown in FIG. 1.

A ferrule of zirconia ceramics was manufactured in outside diameter D of 2.5 mm, length L of 10.5 mm, and through-hole diameter d of 0.126 mm. In an incident side ferrule 1, a single mode optical fiber 11 was adhered and fixed, and in an exit side ferrule 1', a multimode optical fiber 11' was adhered and fixed. By deviating the central positions 11b, 11b' of optical fibers mutually by δ, and optical fibers were connected end to end, in a state of optical axes of optical fibers being inclined by angle ψ. Herein, the eccentric amount δ was 5, 9, 10, 15, 20, 25, and 30 μm in examples, and 0 μm in comparative example. The inclination angle ψ was 2, 3, 10, 20, 25, 26 degrees in examples, and 0 degree in comparative example. In various combinations, the transmission distance was measured while extending the optical fiber length at 50 m increments. The multimode optical fiber was 1960A (Lucent Technology), which has the core diameter was 62.5 μm, and the clad diameter was 125 μm.

Figure 17:
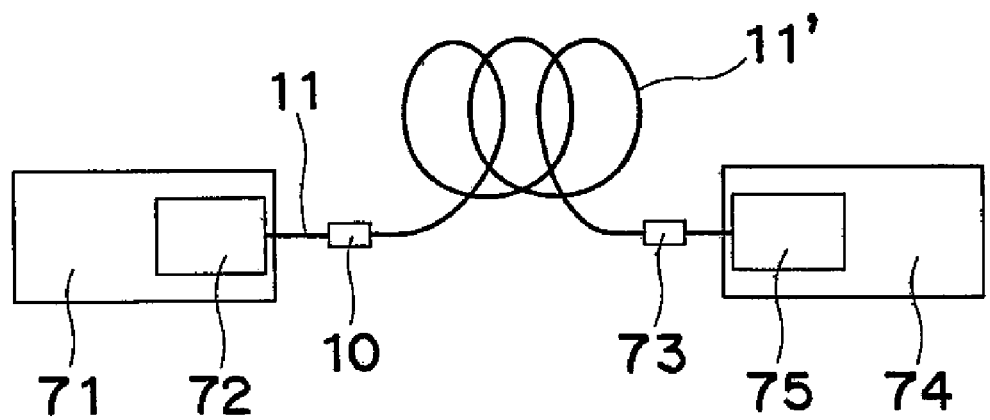
FIG. 17 is a schematic diagram of a measuring system of transmission distance in example 1.

As shown in FIG. 17, from an E/O converter 72 of a transceiver 71, an optical signal was emitted at wavelength of 1310 nm and transmission speed of 10 Gbit/sec, and was connected to the single mode optical fiber 11, and was further connected to the multimode optical fiber 11' to be measured, by way of the optical connector 10 of the invention. The light transmitted through the multimode optical fiber 11' was received in an O/E converter 75 of a receiver 74 by way of a general optical connector 73, and was converted into an electrical signal, and it was checked whether the signal was transmitted correctly or not. Maximum length of the correct signal transmission is shown in Table 1.

TABLE 1

Unit μm)

| | | Angle (Ψ), unit: degrees | | | | | | |
|---|---|---|---|---|---|---|---|---|
| | | 0 | 2 | 3 | 10 | 20 | 25 | 26 |
| Eccentricity (δ), unit: μm | 0 | *0 | *0 | *0 | *0 | *0 | *0 | *0 |
| | 5 | *0 | 100 | 200 | 300 | 200 | 150 | 100 |
| | 9 | *0 | 250 | 550 | 600 | 600 | 550 | 250 |
| | 10 | *0 | 250 | 600 | 650 | 650 | 600 | 300 |
| | 15 | *50 | 300 | 650 | 750 | 700 | 650 | 350 |
| | 20 | *50 | 250 | 600 | 750 | 700 | 600 | 350 |
| | 25 | *0 | 250 | 550 | 600 | 600 | 550 | 300 |
| | 26 | *0 | 150 | 150 | 200 | 150 | 150 | 100 |

Note
*Comparative example
Dotted line frame shows examples in preferred range of the invention.
Double lie frame shows examples in particularly preferred range of the invention.

At eccentricity amount δ of 0 μm comparative example), transmission distance was 0 m regardless of angle ψ. At angle ψ of 0 degree (comparative example), transmission distance did not reach up to 100 m. In the examples of the invention, by contrast, transmission distance of over 100 m was recorded. In particular, when the eccentricity amount δ was in a range of 10 to 25 μm, and the angle ψ was in a range of 3 to 25 degrees, transmission distance was longer than 550 m, and favorable values were obtained. In particular, the eccentricity amount δ was in a range of 15 to 20 μm, and the angle ψ was in a range of 5 to 15 degrees, transmission distance was 750 m, and long transmission distance was obtained.

It is hence known that the signals are transmitted efficiently by deviating the core centers of optical fibers relatively, and inclining the light beam entering one optical fiber from other optical fiber.

Example 2

The mode conditioner 40 shown in FIGS. 4A and 4B was manufactured as follows. Optical connectors 41, 45 were SC type connectors. Connection sleeve 46a at junction 46 was a stainless steel cylindrical piece. Reinforcing member 46b was made of a coated polyester elastomer. Filler 46c was a silicon resin.

The single mode optical fiber 41 and the multimode optical fiber 42 were adhered and fixed. At this time, the core eccentricity amount δ and inclination angle ψ of the single mode optical fiber 41 and the multimode optical fiber were same as in example 1. The single mode optical fiber 41 and the multimode optical fiber 42 were same as in example 1.

Figure 18:
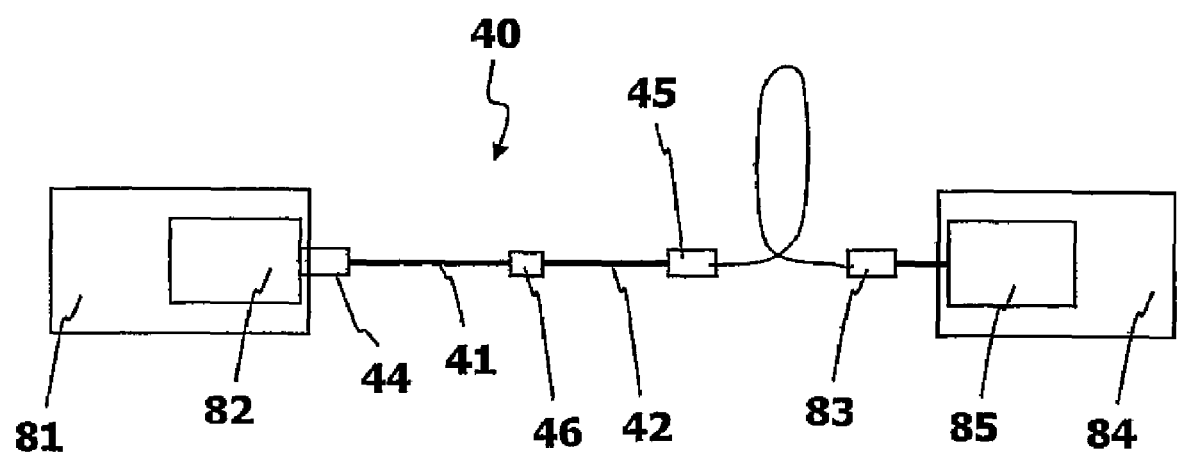
FIG. 18 is a schematic diagram of a measuring system of transmission distance in example 2.

A shown in FIG. 18, an optical signal was emitted from an optical transceiver 82 of LAN device 81 at wavelength of 1310 nm and transmission speed of 10 Gbit/sec, and was connected to the single mode optical fiber 41, and was further connected to the multimode optical fiber 42 to be measured, by way of the mode conditioner 40 of the invention. The light transmitted through the multimode optical fiber 42 was received in an O/E converter 85 of a receiver 84 by way of the optical connectors 45, 83, and was converted into an electrical signal, and it was checker if a correct signal was transmitted or not.

The maximum length of the transmission of correct signal was same as in example 1.

Example 3

The optical transmitter as shown in FIG. 5A was manufactured as follows.

The core center of the single mode optical fiber 53 of the fiber stab 52 was deviated from the core center of the multimode optical fiber 56 in the plug ferrule 55 in a direction of 20 μm. The direction of the light beam entering from the single mode optical fiber 53 was inclined by 10 degrees from the optical axis of the multimode optical fiber 55. Both ends of the fiber stab 52 made of zirconia ceramics were polished, and abutted against the plug ferrule 55 by means of split sleeve 4 similarly made of zirconia ceramics.

As other example, an optical transmitter was manufactured by forming clad mode light eliminating means as shown in FIG. 11 in the single mode optical fiber 53. That is, the outside clad 53d of the single mode optical fiber 53 had a larger refractive index than the inside clad 53c, and a dopant for attenuating the optical signal was contained at least in part of the outside clad 53d of high refractive index. In the core 53a, GeO2 was doped in quartz glass for adding refractive index difference from the clad 53b. The diameter of core 53a was 8 μm, and the relative refractive index difference of the core 53a and the clad 53b was 0.3%. The breakage wavelength was about 1.1 μm. Co (cobalt) was doped in the clad 53d for further attenuating the intensity of the optical signal.

As comparative example, as shown in FIG. 15, an optical transmitter was manufactured by connecting the single mode optical fiber 53 and the multimode optical fiber 56 by deviating the core centers mutually by 20 μm and setting the optical axes parallel to each other.

Anyway, the single mode optical fiber 53 was made of commercial material of SMF-20T of Corning, and the multimode optical fiber 56 was 1960A (Lucent Technology) that has the core diameter of 62.5 μm and the clad diameter of 125 μm.

An optical signal was emitted from a laser diode 51 at wavelength of 1310 nm and transmission speed of 10 Gbit/sec, and the light transmitted through the multimode optical fiber 56 was received, and was converted into an electrical signal, and transmission distance of correct signal was measured. Results are shown in Table 2.

TABLE 2

| | Eccentricity | Inclination of optical axis | Eliminating means | Transmission distance μm) |
|---|---|---|---|---|
| Example 3(1) | 20 μm | 10 degrees | No | 305 |
| Example 3(2) | 20 μm | 10 degrees | Yes | 510 |
| Comparative example | 20 μm | No | No | 25 |

In comparative example, transmission distance was only 25 m, and in the example inclining the optical axis, the transmission distance was extended to 305 m. In the example using the clad mode light eliminating means, the transmission distance was 510 m, and the transmission distance had been improved substantially. Thus, the invention presents the optical transmitter curtailed in the DMD and improved in the CPR.

Comparative Example

As reference example, a single mode optical fiber having the clad mode light eliminating means shown in FIGS. 11 and 13 was prepared, and a transmitter with the mode conditioner was fabricated by using a conventional single mode optical fiber of comparative example.

The single mode optical fiber having the clad mode light eliminating means shown in FIG. 11 was manufactured as follows. The optical fiber consisted of the core 53a, the inside clad 53c, and the outside clad 53d of a clad mode absorbing portion, and in the core 53a, GeO2 was doped in quartz glass for adding refractive index difference from the 53b. The core diameter was 8 μm, and the relative refractive index difference of the core 53a and the clad 53b was 0.3%. The breakage wavelength was about 1.1 μm. Co (cobalt) was doped in the core 53a for attenuating the intensity of the optical signal.

The single mode optical fiber having the clad mode light eliminating means shown in FIG. 13 was manufactured as follows. Between the outside clad 53d and the inside clad 53c of the single mode optical fiber 3, an intermediate clad 53f having smaller refractive index than in the outside clad 53d and the inside clad 53c was formed. In the core 53a, for adding the refractive index difference from the inside clad 53c, GeO2 was doped as dopant in quartz glass. The core diameter was 8 μm, and the relative refractive index difference of the core 53a and the inside clad 53c was 0.3%. The breakage wavelength was about 1.1 μm. The inside clad 53c was the clad mode capturing portion, and Co was doped uniformly as dopant, and the outside diameter is set at 40 μm. The outside clad 53d was made of pure quartz glass, and its outside diameter was 125 μm, same as in standard optical fiber. The intermediate clad (low refractive index portion) 53f was formed, at the outer side of the inside clad 53c and the inner side of the outside clad 53d, in a width of 15 μm. The intermediate clad 53f was a layer in which F (fluorine) was doped uniformly, and its concentration was adjusted so that the relative refractive index might be almost constant at −0.15%.

The single mode optical fiber in comparative example was made of a commercial material SMF-20T of Corning.

The optical transmitter was composed as shown in FIG. 5A. The core centers of the single mode optical fiber 53 and the multimode optical fiber 56 were mutually deviated by 20 μm. Their optical axes were parallel to each other. In the multimode optical fiber 56, the core diameter was 62.5 μm, and the clad diameter was 125 μm.

In the measuring method, an optical signal was emitted from a laser diode 1 at wavelength of 1310 nm and transmission speed of 1 Gbit/sec, and the light transmitted through the multimode optical fiber 56 by way of the single mode optical fiber 53 was received, and was converted into an electrical signal, and transmission distance of correct signal was measured. Results are shown in Table 3.

TABLE 3

| | Inside clad | Intermediate clad | Outside clad | Transmission distance μm) |
|---|---|---|---|---|
| Example of FIG. 11 | Yes | No | High refractive index clad portion + light attenuating dopant | 310 |
| Example of FIG. 13 | Yes | Low refractive index portion | Yes | 330 |
| Comparative example | | Common | | 25 |

In comparative example, transmission distance was only 25 m, and in the example forming the clad mode light eliminating means shown in FIG. 11, the transmission distance was 310 m. In the example forming the clad mode light eliminating means shown in FIG. 13, the transmission distance was 330 m, and the transmission distance had been improved substantially.

The invention claimed is:

1. An optical connector comprising:
a first optical fiber having a core and a clad,
a first fixing member having a through-hole for fixing said first optical fiber;
a second optical fiber having a core and a clad, and
a second fixing member having a through-hole for fixing said second optical fiber;
wherein the through-hole of the first fixing member is formed so that a diameter of the through-hole on the side of an end of said first optical fiber is larger than a diameter of the through-hole on a rear side,
wherein an end portion of the first optical fiber is bended in the large diameter portion,
wherein said end of said first optical fiber and an end of said second optical fiber are connected by connecting the first fixing member and the second fixing member,
wherein said first optical fiber is a single mode optical fiber and said second optical fiber is a multimode optical fiber, and said first fixing member and said second fixing member are connected so that the distance between the core center of said first optical fiber and the core center of said second optical fiber is 10 to 25 μm,
wherein said optical axis of said first optical fiber is inclined to the optical axis of the second optical fiber, and
wherein the light beam entering said second optical fiber from said first optical fiber is inclined by 3 to 25 degrees to the central axis of said second optical fiber.

2. The optical connector according to claim 1,
wherein, supposing the direction linking the core center of said first optical fiber and the core center of said second optical fiber to be X-axis, the central axis direction of said second optical fiber to be Z-axis, and the direction at right angle to the X-axis and Z-axis to be Y-axis, and further
supposing the axis by deviating the Y-axis by the distance δ between the core center of said first optical fiber and the core center of said second optical fiber in the X-direction to be Y'-axis, and the axis by deviating the Z-axis by the distance δ in the X-direction to be Z'-axis,
said light beam exists inside of a plane formed by the Y'-axis and Z'-axis.

3. The optical connector according to claim 1,
wherein said first fixing member and said second fixing member are inserted into a bent cylindrical sleeve.

4. An optical transmitter comprising:
a laser diode,
a fiber stab for holding a first optical fiber in a through-hole, and
a sleeve for inserting a plug ferrule, which holds a second optical fiber in a through-hole, from outside, said sleeve being fitted on said fiber stab,
wherein the through-hole of the fiber stab is formed so that a diameter of the through-hole on the side of said plug ferrule is larger than a diameter of the through-hole on the side of said laser diode,
wherein said first optical fiber is bended in the through-hole on the side of said plug ferrule,
wherein, when said plug ferrule is inserted, said first optical fiber in said fiber stab and said second optical fiber in said plug ferrule are optically connected,
wherein the distance between the core center of said first optical fiber and the core center of said second optical fiber is 5 to 30 μm,
wherein said optical axis of said first optical fiber is inclined to the optical axis of the second optical fiber, and
wherein light beam entering said second optical fiber from said first optical fiber is inclined by 3 to 25 degrees to the central axis of said second optical fiber.

5. The optical transmitter according claim 4,
wherein supposing the direction linking the core center of said first optical fiber and the core center of said second optical fiber to be X-axis, the central axis direction of said second optical fiber to be Z-axis, and the direction at right angle to the X-axis and Z-axis to be Y-axis, and further
supposing the axis by deviating the Y-axis by a distance δ between the core center of said first optical fiber and the core center of said second optical fiber in the X-direction to be Y'-axis, and the axis by deviating the Z-axis by the distance δ in the X-direction to be Z'-axis, said light beam exists inside of a plane formed by the Y'-axis and Z'-axis.

6. The optical transmitter according to claim 4, wherein the clad of said first optical fiber has a eliminating means for eliminating clad mode light.

7. The optical transmitter according to claim 6, wherein the clad of said first optical fiber has an inside clad of smaller refractive index than in the core, and an outside clad disposed at the outside side of the inside clad and having a greater refractive index than the inside clad.

8. The optical transmitter according to claim 7, wherein a dopant for attenuating an optical signal is contained at least in part of the outside clad.

9. The optical transmitter of claim 7, wherein the clad of said first optical fiber has an intermediate clad having the same refractive index as the core of said first optical fiber, disposed between an outside clad and an inside clad.

10. The optical transmitter according claim 7, wherein the clad of said first optical fiber has an intermediate clad disposed between an outside clad and an inside clad, said intermediate clad having a smaller refractive index than said inside clad.

11. The optical transmitter according to claim 7, wherein a light attenuating dopant is contained at least in part of the side closer to the core of said inside clad.

12. The optical transmitter according to claim 4, wherein said first optical fiber is a single mode optical fiber, and said second optical fiber is a multimode optical fiber.

* * * * *